United States Patent [19]

Yassa et al.

[11] Patent Number: 5,400,383
[45] Date of Patent: Mar. 21, 1995

[54] FLUOROSCOPIC IMAGER WITH FRAME-FILLING APPARATUS

[75] Inventors: Fathy F. Yassa, Clifton Park; Aiman A. Abdel-Malek; John J. Bloomer, both of Schenectady, all of N.Y.

[73] Assignee: General Electric Company, Schenectady, N.Y.

[21] Appl. No.: 805,248

[22] Filed: Dec. 9, 1991

[51] Int. Cl.$^6$ .............................................. H05G 1/38
[52] U.S. Cl. ..................................... 378/98.2; 378/95; 378/901
[58] Field of Search ............................ 378/901, 95, 99; 358/111; 364/413.18, 413.16

[56] References Cited

U.S. PATENT DOCUMENTS

| | | | |
|---|---|---|---|
| 4,002,910 | 1/1977 | LeMay | 250/360 |
| 4,415,889 | 11/1983 | Davis | 340/728 |
| 4,460,958 | 7/1984 | Christopher et al. | 364/200 |
| 4,481,309 | 11/1984 | Sasaki et al. | 340/728 |
| 5,224,141 | 6/1993 | Yassa et al. | 378/99 |

OTHER PUBLICATIONS

Itch et al, "A Dose-Reducing TV Fluoroscopy System", Mar. 1973, pp. 19-24, Toshiba Review Int. Ed., Japan.
A. Abdel-Malek et al., "Image Segmentation Via Motion Vector Estimates", SPIE vol. 1233, *Medical Imaging IV:Image Processing* (1990), Feb. 6, 1990.

*Primary Examiner*—Paul M. Dzierzynski
*Assistant Examiner*—David V. Bruce
*Attorney, Agent, or Firm*—Enrique J. Mora; Paul R. Webb, II

[57] ABSTRACT

A fluoroscopic imager for observing a living creature with reduced x-ray dosage uses a video monitor for displaying frames of image samples received during respective ones of frame scan intervals that regularly and successively occur at a display frame rate sufficiently high that brightness flicker is acceptably low to a human observer; an x-ray source that can be gated on for intervals not as long as a display frame; and a fluoroscopic camera, including a raster-scanning video camera and x-ray-to-light conversion apparatus with persistence not appreciably longer than a display frame and frame-filling apparatus. Especially during purely diagnostic procedures, the frame-filling apparatus generates a continuous succession of frames of image samples at the display frame rate by interpolating between successively grabbed frames of image samples. During procedures in which interpolating between successively grabbed frames of image samples introduces unacceptable delay in the observed image, the frame-filling apparatus generates the continuous succession of frames of image samples by extrapolating from each most recently grabbed frame.

5 Claims, 20 Drawing Sheets

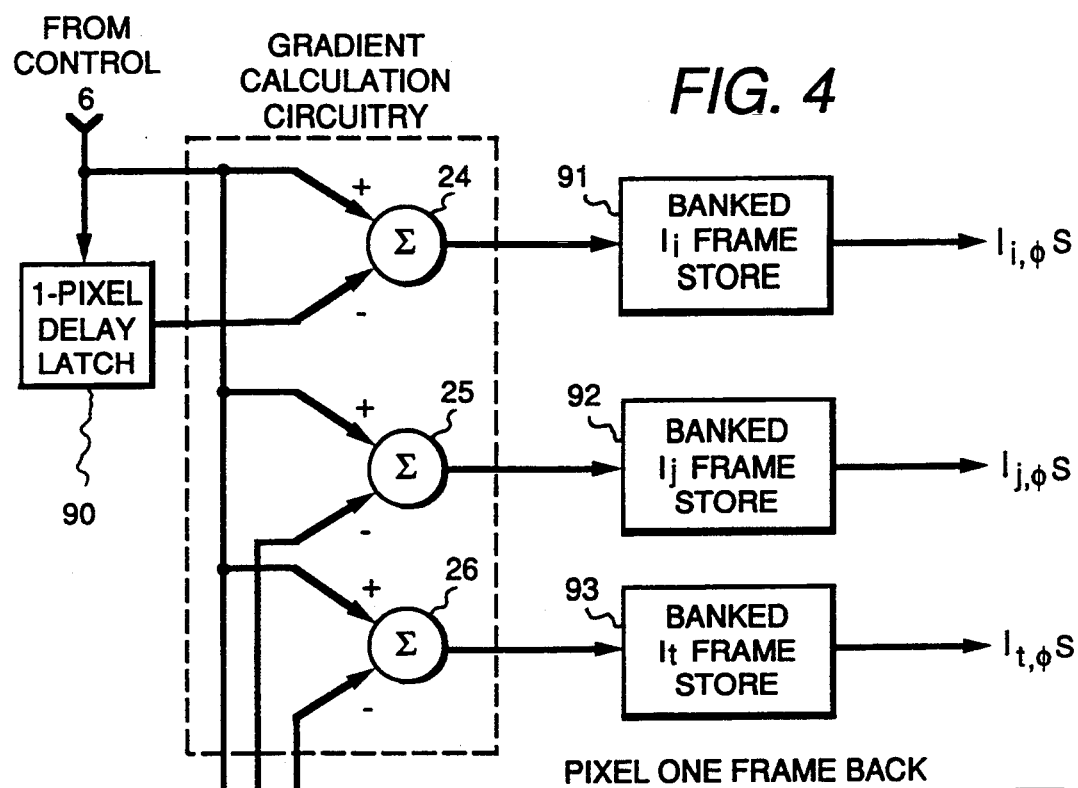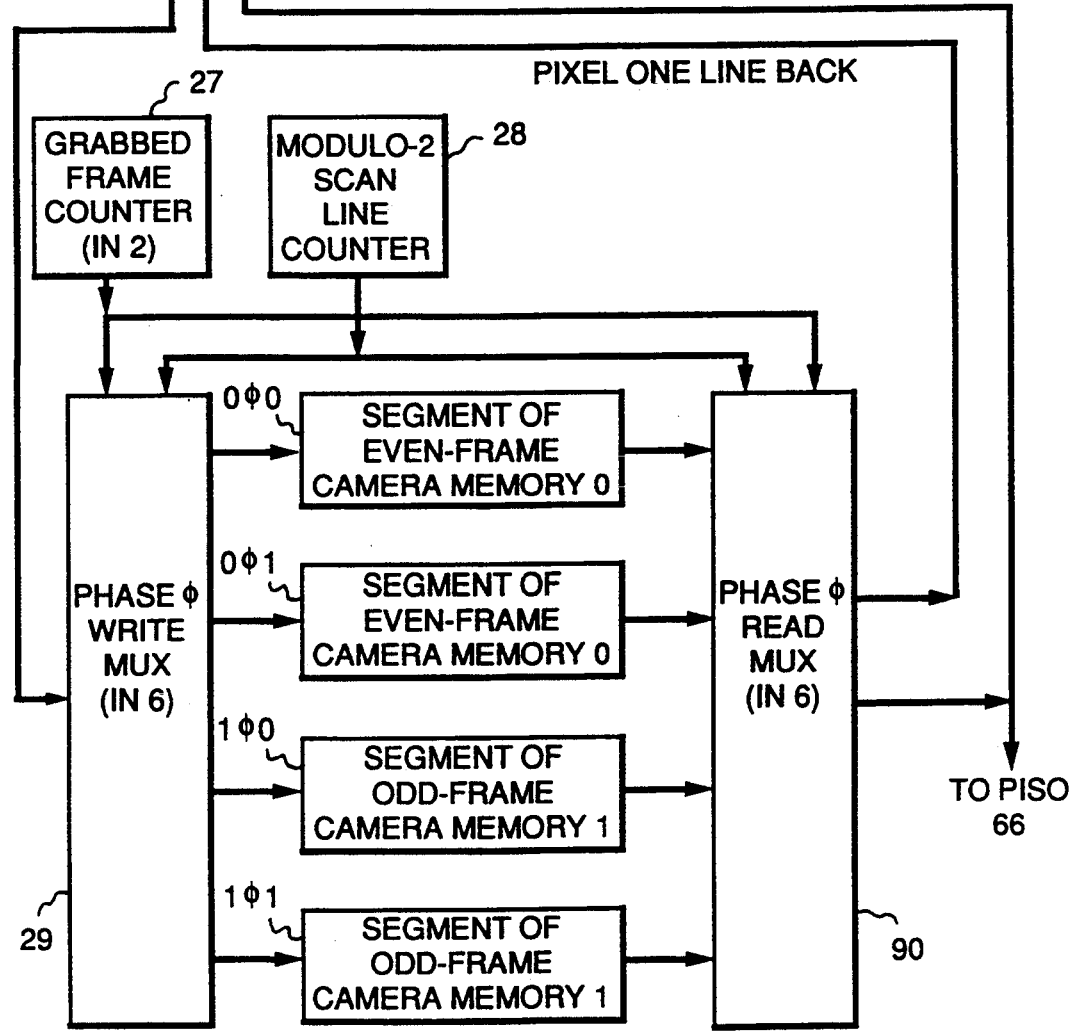
FIG. 4

FLUOROSCOPIC IMAGER WITH FRAME-FILLING APPARATUS

The invention relates to fluoroscopic imagers and, more particularly, to providing for the reduction of cumulative exposure to x-rays of a living creature that is being observed.

RELATED PATENT APPLICATIONS

The fluoroscopic imaging apparatus of the invention is useful in implementing methods for reducing the cumulative exposure to x-rays of a living creature that is being observed. Such a method is described by F. F. Yassa, A. A. Abdel-Malek, J. J. Bloomer and C. Srinivas in their U.S. patent application Ser. No. 07/651,074 filed Feb. 6, 1991, now abandoned, entitled "FLUOROSCOPIC METHOD WITH REDUCED X-RAY DOSAGE", and assigned to General Electric Company.

BACKGROUND OF THE INVENTION

Prior art fluoroscopic imaging systems use x-ray tubes that are intermittently powered by application of pulses thereto, which tubes generate the x-ray beams directed through the inwards of a living creature being observed to a screen of phosphorescent material or to an array of scintillators. The pattern of x-ray penetration through the creature being observed is thereby converted to a light pattern. Optics focus the light pattern to generate an image within a video camera. Each pulse of x-ray beams generates a respective image for the video camera, which image is scanned by the electronic camera device to generate a respective frame of video input signal for a video monitor. A video monitor is like a television receiver without the front end portions used to detect video signal from radio waves. The video monitor requires a prescribed regular frame rate for the video signals it receives if, as is the usual practice, the video monitor uses a kinescope with electromagnetic deflection and the electromagnetic deflection uses resonant energy recovery methods. The pulse rate for gating the x-ray tube into operation has been chosen high enough that the regular rate of frames generated by the electronic camera device is sufficiently high to avoid excessive flicker in the average brightness level of the visual display generated by the video monitor. The flicker in the average brightness level can be reduced by using longer-persistence phosphors in the viewing screen of the video monitor, but smear of moving objects becomes noticeable with long-persistence phosphors. The human observer is more sensitive to flicker at higher light levels, but when using normal-persistence kinescope phosphors a 60 Hz flicker rate is deemed to be unobjectionable at normal room light levels when viewing broadcast television (which is raster scanned interlacing the scan lines of alternate fields). Somewhat more display flicker is tolerated in fluoroscopy than in broadcast television, progressive scanning at 30 Hz frame rate being a customary practice in fluoroscopy employing a video camera. The display frame rate is a fixed rate to accommodate resonant energy recovery in the electromagnetic deflection circuitry for the kinescope in the video monitor.

It is known in the prior art that the introduction of a frame storage device between the electronic camera device and the video monitor can avoid x-ray exposures having to be made at the display frame rate in order that the electronic camera device can generate consecutive frames of image samples for the video monitor at a display frame rate high enough to avoid flicker in the average brightness level of the video monitor. Each frame of video camera samples generated during a respective one of less frequent x-ray exposures is written to the frame store in a procedure called "frame grabbing". The writing of the frame store is performed in synchronism with the raster scanning of the video camera, during which frame the image samples are supplied directly to the video monitor. The frame of image samples stored in the frame store can then be repeatedly raster scanned to supply repeated frames of image samples until an updating frame of image samples is available from the video camera responsive to the next x-ray exposure. Accordingly, the use of the frame store facilitates lowering on average the pulse rate for gating the x-ray tube into operation. This reduces the dosage of x-rays to which the living creature being observed is exposed over a given period of time. Because the frame store permits the display to be refreshed at frequent intervals despite x-ray exposures occurring less frequently during a "fluoroscope" mode of operation, shorter-persistence phosphors can be used in the viewing screen of the video monitor. The shorter-persistence phosphors avoid smearing during an alternative, "cinematic" or "cine" mode of operation in which the x-ray exposures occur more frequently—e.g., at the frame rate for the display.

With the use of the frame store, the intolerance of a human observer to motion flicker, or the stroboscopic effect of reduced frame rate, in the video display on the video monitor screen sets a lower limit on the pulse rate for gating the x-ray tube. Experienced clinicians accept considerable amounts of motion flicker when fluoroscopically monitoring certain invasive surgical procedures, such as balloon angioplasty; and the pulse rate for gating the x-ray tube operation can be regular, but slower than a 30 Hz frame rate at which a display is refreshed from a frame storage device.

Motion flicker becomes more noticeable as motion becomes faster, so the degree of reduction of the pulse rate for gating the x-ray tube operation is limited as a function of the rate of motion in the portion of the inwards of the living creature being fluoroscoped. Accordingly, for implementing their methods of x-ray dose reduction, Yassa, Abdel-Malek, Bloomer and Srinivas advocated using fluoroscopic apparatus that provides a range of pulse rates that can be keyed to the nature of the organ(s) being observed by their fluoroscopic system.

The Yassa, Abdel-Malek, Bloomer and Srinivas methods for fluoroscopically observing a living creature with reduced x-ray dosage reduce the frequency at which successive x-ray images are obtained, to be closer to the minimum rate at which motion is satisfactorily observable, and use frame filling apparatus to provide a video monitor with video information at a frame rate sufficiently high that excessive flicker of the average brightness of the display is avoided. The reduction in the frame rate is done, taking into consideration both clinical needs and the speeds of motion of the organs being observed fluoroscopically. Mere observation of organ motion for diagnostic reasons may not have the speed of response requirements that observation of catheter insertion has, for example. For the observation of relatively slow-moving processes—such as peristalsis, for example—a lower frame rate may be selected than for relatively fast-moving processes—such as esophageal action, for example.

In fluoroscopic imaging, the x-radiation is not focussed (although it is fairly well collimated). Accordingly, it has not been the practice in fluoroscopy to select only small portions of the image field associated with high rates of non-uniform motion for more frequent sampling than other portions of the image field exhibiting slower and more uniform rates of motion.

However, a reduction in the frame rate may be done in such manner that the frame rate is no longer uniform, but rather is more reduced during periods of lesser sample interest and is less reduced during periods of greater sample interest. The periods of greater and lesser sample interest are determined in certain of the methods described in U.S. patent application Ser. No. 07/651,074, by analyzing the degree of change in successive x-ray images and increasing image rate when motion between frames becomes excessive. However, the reaction time needed for making such changes is too slow for certain types of fluoroscopic observations. Accordingly, in other methods described in U.S. patent application Ser. No. 07/651,074, the periods of greater and lesser sample interest are determined by recourse to auxiliary organ monitoring means—e.g., an electrocardiograph in the instance where the organ of interest is the heart or another portion of the circulatory system.

The Yassa, Abdel-Malek, Bloomer and Srinivas methods rely on frame filling apparatus to reduce the motion flicker that occurs when the pulse rates for gating the x-ray tube are lowered, so that a greater reduction of the pulse rate for gating the x-ray tube can be tolerated and the average dose of radiation over a given time can be reduced still more. The frame-filling apparatus described in U.S. patent application Ser. No. 07/651,074 performs interpolation between successive frames of actual image data, thereby to generate intervening fill frames. In this regard, A. Abdel-Malek, O. Hasekioglu and John Bloomer describe a feasibility study they made with regard to reducing pulse rates for gating the x-ray tube in fluoroscopic apparatus in their paper "Image segmentation via motion vector estimates", SPIE Vol. 1233 Medical Imaging IV: Image Processing (1990), pp. 366–371, published Feb. 6, 1990. This feasibility study (incorporated herein by reference) found that acceleration-compensated interpolation techniques provided superior estimates of fill frames. The feasibility study was made processing sequences of recorded images in extended time. Arranging for frame-interpolation techniques to reduce the motion flicker that occurs when the pulse rates for gating the x-ray tube are lowered, which techniques meet the requirements that they be executed in substantially real time, presented a substantial technical challenge.

Frame-interpolation techniques which are executed in substantially real time are adequate for mere observational procedures, as used in the diagnosis of certain functional abnormalities in the organs of a living creature being subjected to fluoroscopic examination. As the number of fill frames between frames of actual image data increases, however, there is an increased waiting time for the most recent frame of actual image data to occur. This lengthens the response time of the imager, since the display of the most recent frame of actual image data takes place only after the display of all the preceding fill frames generated by interpolation, and since the display of all the preceding fill frames generated by interpolation has to await the generation of those fill frames proceeding from the most recent frame of actual image data. In certain surgical procedures in which the surgeon fluoroscopically observes the results of his actions, the response time of a fluoroscopic imager using interframe interpolation procedures to insert several fill frames between frames of actual image data is adjudged as being too slow to provide the surgeon adequate visual feedback to guide his actions with sufficient precision.

Accordingly, the practice has been to use the "fluoroscope" rather than "cine" mode of operation for monitoring invasive surgical procedures, such as balloon angioplasty. In the "cine" mode of operation the frame available for observation is generated by temporally interpolating between the last frame available and its predecessor frame, and time lag in the generation of the frame available for observation becomes very noticeable. In the "flouroscope" mode of operation the last frame available is continually the one available for observation, and time lag is not as noticeable. It is desirable to have fluoroscopic imaging apparatus that provides still another mode of operation, which has both the lower motion flicker of the "cine" mode of operation and the less noticeable time lag of the "fluoroscopic" mode of operation.

The inventors have found that, as the ratio of fill frames to frames of actual image data is reduced in order to improve imager response time, it is possible to keep within tolerable bounds the errors associated with extrapolating fill frames from the most recent frame of actual image data using the pixel flow rate and its temporal derivatives as determined on an interframe basis. The generation of fill frames by extrapolation procedures can go forward immediately after receiving the most recent frame of actual image data. Accordingly, imager response time is improved over what is possible with interframe interpolation and the desired new mode of operation can be provided.

The determination of the pixel flow rate and its temporal derivatives on an interframe basis has satisfactory accuracy only if the dosage level for each frame are sufficiently high to keep speckle effects reasonably low, however, so the dosage level for each frame has to be higher than in the "fluoroscopic" mode of operation. The monitoring of certain invasive surgical procedures where a surgeon can tolerate motion flicker, such as balloon angioplasty, may continue better to be done in the "fluoroscopic" mode of operation to reduce patient exposure to x-radiation. Other invasive surgical procedures where a surgeon cannot tolerate motion flicker as well, such as new angioplasty techniques using a whirling cutter to clear blockages from blood vessels, can benefit from the new mode of operation being provided by the fluoroscopic apparatus.

SUMMARY OF THE INVENTION

A fluoroscopic imager for observing a living creature with reduced x-ray dosage uses a video monitor for displaying frames of image samples received during respective ones of frame scan intervals that regularly and successively occur at a display frame rate sufficiently high that brightness flicker is acceptably low to a human observer; an x-ray source that can be gated on for intervals not as long as a display frame; a fluoroscopic camera, including a raster-scanning video camera and x-ray-to-light conversion apparatus with persistence not appreciably longer than a display frame; and frame-filling apparatus. During only selected ones of successive frame scan intervals, x-ray radiation is directed from the gated x-ray source through the living creature; the x-ray shadow of at least a portion of the living creature is viewed with the fluoroscopic camera. The frame-filling apparatus grabs frames of image samples from the raster-scanning video camera, to be stored in a frame store and used as a basis for generating for application to the video monitor a continuous succession of frames of image samples at the display frame rate. At least at times, in accordance with the invention, the frame-filling apparatus generates the continuous succession of frames of image samples at the display frame rate by extrapolating from each most recently grabbed frame.

BRIEF DESCRIPTION OF THE DRAWING

FIG. 4 is a schematic diagram of gradient calculation circuitry in the FIG. 1 fluoroscopic apparatus.

DETAILED DESCRIPTION

Figure 1:
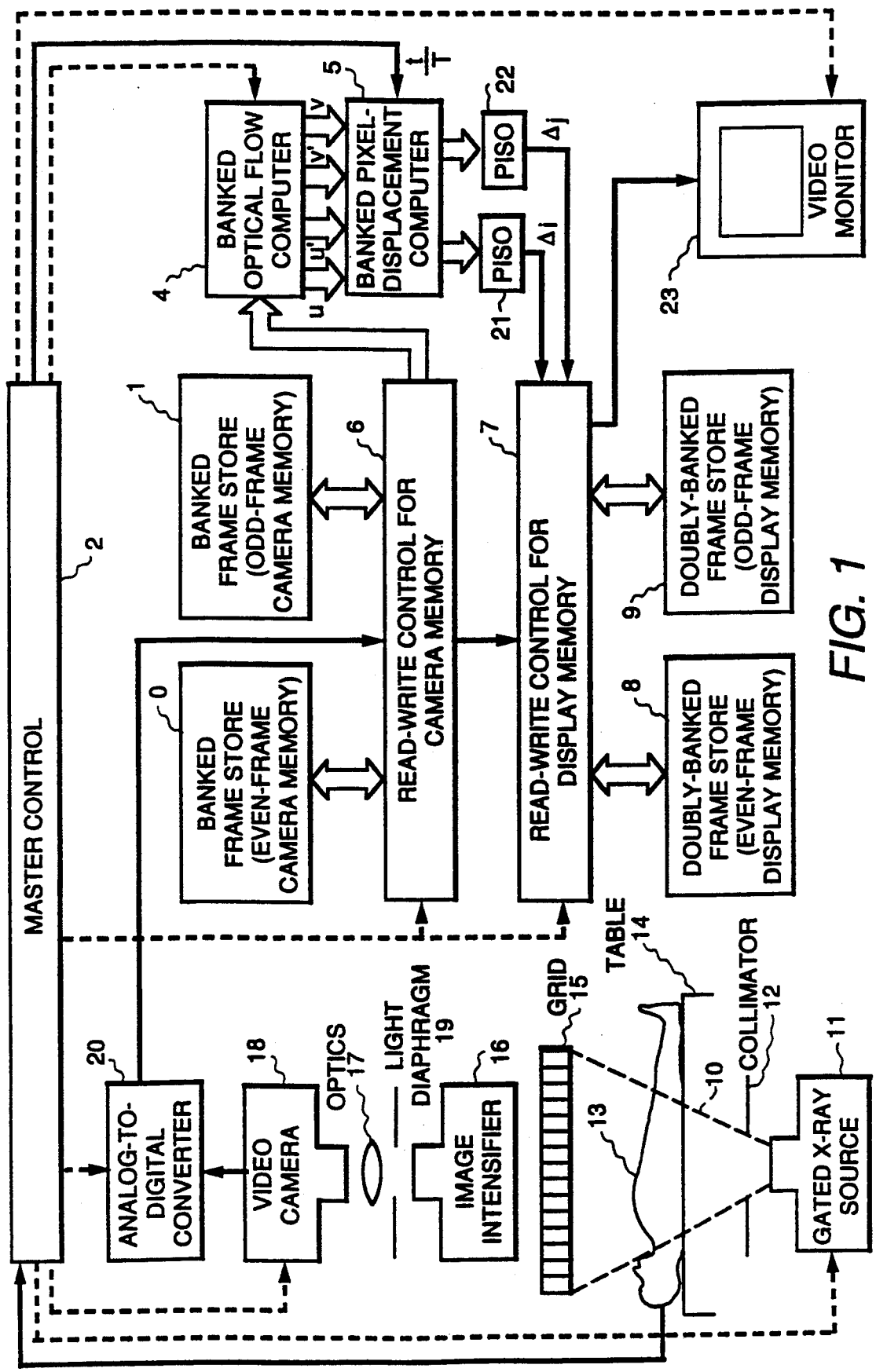
FIG. 1 is a schematic diagram of fluoroscopic apparatus embodying the invention, which fluoroscopic apparatus is arranged to operate at reduced image rate and to include frame-filling apparatus.

Fluoroscopic imaging apparatus with the capability of observing a living creature with reduced x-ray dosage in either "fluoroscopic" or "cinematic" modes of operation relies heavily on suitable frame filling apparatus. It is desirable to minimize the number of frames of storage required in a frame-filling apparatus, to reduce the complexity of the apparatus and the attendant increased likelihood of malfunction, and to reduce system power requirements, as well as to reduce system cost.

Many of the frame-filling apparatus designs known in the prior art are designed for communications systems in which the desire is to reduce the rate of data transmissions so that the transmissions can be made via media of reduced bandwidth. In such systems the possibility exists of segmenting images into changing and non-changing portions and, usually at the cost of increased sensitivity to noise encountered in the transmission process, transmitting information concerning only the changing portions of the image. The requirements on frame-filling apparatus for fluoroscopic apparatus do not readily admit of segmenting images into changing and non-changing portions. The x-ray irradiation is by its nature broad-beam in nature and not capable of being tightly focussed so as to allow individual pixel scanning procedures. So, if an x-ray exposure is made, the fluoroscopic camera will generate an entire frame of new samples. Speckle effects are appreciable in the x-ray images, particularly when x-ray pulse energy is reduced by shortening the pulse. To reduce the visibility of the speckle effects on a video monitor, it is desirable that the observer's eye be able to integrate optically image samples from as many frames of camera samples as possible within its optical integration time constant.

As noted in the Abdel-Malek et alii paper "Image segmentation via motion vector estimates", at least for medical imaging, acceleration-compensated interpolation techniques provided estimates of fill frames superior to the linear interpolation techniques used in many prior-art frame-filling apparatuses. The optical flow vector composed of pixel velocity components in two orthogonal directions, which optical flow vector is employed in linear interpolation techniques, is continuously corrected over time in accordance with pixel displacement acceleration components in the two orthogonal directions. To the extent that these pixel displacement acceleration components in the two orthogonal directions tend to be the same in a time interval between successive frames of camera-originated image samples as they will be in the next such time interval, the pixel velocity and acceleration components in the two orthogonal directions can be used to generate fill frames of image data for that next such time interval that correspond closely to frames of camera-originated image samples that could have been obtained with additional x-radiation exposures. The term "pixel velocity" is used in this specification with reference to displacement during the time between frames of actual X-ray data, which is often a changing (rather than fixed) time base; and normalization to take into account the changing time base is needed to convert "pixel velocity" to a true pixel velocity independent of time base. A similar observation can be made respective to the term "pixel acceleration" as used in this specification.

Without the acceleration compensation of the optical flow vector determined on an interframe basis, that unchanging optical flow vector often provides an erroneous basis for extrapolation computations. However, where hardware costs are a constraint, that unchanging optical flow vector may be the sole basis for extrapolation computations. Where hardware costs are a much less important design consideration than best performance, extrapolation may be carried out taking into consideration even higher-order temporal derivatives of the optical flow vector, particularly where extrapolation is done on the basis of more than two frames. Extrapolation may be done on the basis of more than two frames to reduce errors arising from speckle caused by short-duration pulses of x-radiation.

The frame-filling apparatus which is described below, with regard to the FIG. 1 fluoroscopic apparatus, can generate fill frames by extrapolating from each most recently grabbed camera-originated frame and is presently preferred over frame-filling apparatus which can only generate fill frames by interpolation between pairs of previous camera-originated frames. The reason for this preference is the decreased latency time of the displayed image, which is desirable when the fluoroscopic observations are of a procedure performed by the observer. Where the fluoroscopic observations are used solely for diagnosis, somewhat more accurate fill frames can be computed by the FIG. 1 frame-filling apparatus by just using interpolation between pairs of previous camera-originated frames. The FIG. 1 fluoroscopic apparatus will be first described as generating fill frames by interframe interpolation; later, with reference to FIG. 3, an explanation will be made of the generation of fill frames by extrapolating from the most recently grabbed frame of image samples.

FIG. 1 shows fluoroscopic apparatus for reducing the dosage of x-ray radiation 10 with which a gated x-ray source 11 with a collimator 12 irradiates a human being 13 lying on a table 14 transparent to the x-ray radiation 10. The x-ray illumination passes through the table 14 and the human being 13 (and optionally through a grid 15, which suppresses scatter) to an image intensifier tube 16, which has a screen of phosphorescent material or an array of scintillators that emits light. The image of the x-ray shadow of the irradiated portion of the human being 13 contained in this light emission is focused by optics 17 onto the photosensitive screen of a video camera 18. To avoid coma, the persistence of light emission from the screen of phosphorescent material or array of scintillators in the image intensifier 16 is not long as compared to the frame scan interval, and the x-ray source 11 is gated to supply a beam of x-ray radiation 10 that is pulsed for a duration shorter than the frame scan interval.

The video camera 18 is preferably a solid-state camera, such as one using a charge-coupled-device (CCD) imager, so that the raster-scanned samples in each image field are temporally aligned, rather than being skewed in time. The video camera 18 is also preferably of progressive-scanning type wherein each frame of video consists of samples from a single image field, this being preferred so the raster-scanned samples in each frame are temporally aligned. The intensity of the light transmitted to the video camera 18 is adjusted by a light diaphragm 19. The video camera 18 is assumed to raster scan the x-ray image at the display frame rate in the FIG. 1 fluoroscopic apparatus. Accordingly, the video camera 18 provides frames of raster-scanned x-ray image information in analog form to an analog-to-digital converter 20, wherein frames of raster-scanned x-ray image information are interspersed among frames of raster-scanned signal devoid of x-ray image information. The analog-to-digital converter 20 is preferably of the flash converter type and generates digital words representative of the image intensity $I_{(i,j,t)}$ at the picture elements (pixels) of the image. Master control circuitry 2 controls the gating of the x-ray source 11, the raster scanning by the video camera 18 and the sampling of the analog-to-digital converter 20, as well as controlling other functions, as will be presently described.

In closed-circuit television systems utilizing frame stores it is a common practice, not only to use progressive rather than interlaced-field scanning, but also to arrange for an integral power of two active scan lines in each frame and to add a smaller integral power of two non-active scan lines for accommodating vertical retrace in the video monitor. Typically, 512 active scan lines are used in each frame with 32 non-active scan lines for accommodating vertical retrace. The number of pixels per active portion of each scan line are normally chosen to be the same as the number of active scan lines, and the number of pixels per non-active portion of each scan line for accommodating horizontal retrace in the video monitor is about one-eighth as large. Typically, 512 active pixels and 64 non-active pixels are used in each scan line. A display area of 512 by 512 active pixels is readily mapped into a random access memory that is addressed by two orthogonal Cartesian-coordinate addresses expressed in binary coded format; and this display format will be assumed to be used, in order to keep the description as straightforward and simple as possible. Persons skilled in the art of television system design and acquainted with this specification will thereby be enabled to design variants of the particular system being described, such as those which use interlacing of video samples.

A frame store 0 and a frame store 1 comprise a camera memory. The successive frames of the progressively-scanned video output signal from the analog-to-digital converter 20, as noted above, comprises frames of raster-scanned x-ray image information interspersed among frames of raster-scanned signal devoid of x-ray image information. Only the frames of raster-scanned x-ray image information are of interest; and read/write control circuitry 6 for the camera memory grabs those frames for writing into one of the frame stores 0 and 1. One way of implementing such frame grabbing is: using a grabbed-frame counter for counting GRAB FRAME commands going to ONE, thereby to generate consecutive ordinal numbers modulo-two that enumerate the frames to be grabbed; ANDing the modulo-two count with the GRAB FRAME commands to generate write-enable commands for the frame store 0, causing the zeroeth or even grabbed frames to be written to the frame store 0; and ANDing the complement of the modulo-two count with the GRAB FRAME commands to generate write-enable commands for the frame store 1, causing the first or odd grabbed frames to be written to the frame store 1.

The read/write control 6 for the camera memory reads from the frame stores 0 and 1 to supply an optical flow computer 4 with three parallel-in-time streams of image samples. In the optical flow computer 4 a first of these three streams of image samples is differentially combined with itself as subjected to a one pixel delay to generate a stream of $I_i$ samples that are spatial derivatives of image intensity in a direction parallel to scan lines. A second of the three streams of image samples supplied to the optical flow computer 4 is delayed one line scan interval respective to a first of these three streams of image samples, to be differentially combined in the optical flow computer 4 with the first stream of image samples to generate a stream of $I_j$ samples that are spatial derivatives of image intensity in the direction perpendicular to scan lines. To facilitate providing the second stream of image samples with a delay of one line scan interval respective to the first stream of image samples, the frame stores 0 and 1 are of banked construction. A third of the three streams of image samples supplied to the optical flow computer 4 is delayed one frame scan interval respective to the first stream of image samples, to be differentially combined in the optical flow computer 4 with the first stream of image samples to generate a stream of $I_t$ samples that are derivatives of image intensity respective to time.

As will be described in greater detail further on, the optical flow computer 4 subsequently uses $I_i$, $I_j$ and $I_t$ to calculate components u and v of the displacement of each individual pixel from one frame to the next. The component u of the velocity vector is in the direction parallel to scan lines, and the component v of the velocity vector is in the direction transverse to scan lines. The optical flow computer 4 is shown in FIG. 1 as also computing u' and v', the derivatives with respect to time of u and v. In a simple frame filling procedure using linear pixel interpolation, in each fill frame, with respect to a frame of camera-originated image samples, each pixel has (horizontal) displacement $\Delta i = u(t/T)$ and (vertical) displacement $\Delta j = v(t/T)$ in the directions respectively parallel with and transverse to scan lines. Where hardware costs are not an overriding design concern, a preferable frame filling procedure is, as indicated in the Abdel-Malek, et alii paper "Image segmentation via motion vector estimates", to use acceleration compensated interpolation, wherein, in each successive frame of fill, each pixel is displaced by $\Delta i = u(t/T) + 2^{-1} u'(t/T)^2$ in the direction parallel with scan lines, and each pixel is displaced by $\Delta j = v(t/T) + 2^{-1} v'(t/T)^2$ in the direction transverse to scan lines.

A pixel-displacement computer 5 uses the u, v, u' and v' samples to calculate the modifications that have to be made to a frame of camera-originated image samples in order to generate a fill frame of image samples. The volume of calculations that must be carried out by the computers 4 and 5 within one frame interval is sufficiently large that parallel computation is necessary, and computers 4 and 5 both are of banked construction to facilitate calculations of the u, v, u' and v' samples being carried out on a polyphase basis. It is convenient to do this banking on the basis of spatial phasing in the direction parallel to scan lines, using an integral power of two number of spatial phases—e.g., 16 or 32. Responsive to blocks of $\Delta i$ samples of assorted spatial phases generated by the pixel-displacement computer 5, a parallel-in/serial-out register 21 supplies a serial stream of $\Delta i$ samples. The $\Delta i$ samples describe the displacement of a pixel, in the direction parallel to scan lines, proceeding from a camera-originated frame of image samples to a fill frame of samples. Responsive to blocks of $\Delta j$ samples of assorted spatial phases generated by the pixel-displacement computer 5, a parallel-in/serial-out register 22 supplies a serial stream of $\Delta j$ samples. The $\Delta j$ samples describe the displacement of a pixel, in the direction transverse to scan lines, proceeding from a camera-originated frame of image samples to a fill frame of samples.

A video monitor 23 displays, during successive display frame intervals that occur at regular rate, frames of video samples read from a display memory, which display memory comprises in FIG. 1 read/write control circuitry 7 for display memory, a frame store 8 for even frames, and a frame store 9 for odd frames. At any time except during retrace intervals, one of the frame stores 8 and 9 in this display memory is currently being read through the read/write control circuitry 7 to provide raster-scanned video samples to the video monitor 23. The frame stores 0 and 1 store the successive frames of from-camera samples, one of which frames the read/write control circuitry 6 for the camera memory reads to read/write control circuitry 7 for display memory, thence to be written with or without modification to an appropriate one of the frame stores 8 and 9. The successive frames of from-camera samples stored in frame stores 0 and 1 also are the basis from which computers 4 and 5 calculate the $\Delta i$ and $\Delta j$ modifications the read/write control circuitry 7 for the display memory must make to generate each successive fill frame needed to update the contents of the one of the frame stores 8 and 9, other than the one that is currently being read to supply raster-scanned video samples to the video monitor 23.

The nature of the computation of the orthogonal components u and v of a velocity vector for each pixel in the optical flow computer 4 will now be described in more detail. Let $I(i,j,t)$ be the irradiance of the image at point $(i,j)$ and time t, and $u(i,j)$ and $v(i,j)$ be the optical flow (or velocity) components in the i and j directions, respectively. An optical flow constraint equation can be derived using the assumption that the irradiance will be the same at point $(i+\delta i, j+\delta j)$ at time $t+\delta t$. Hence, $$I(i+u\,\delta t, j+v\,\delta t) = I(i,j,t), \tag{1}$$

where $u\,\delta t = \delta i$ and $v\,\delta t = \delta j$, for small time intervals, $\delta t$. If the irradiance, $I(i,j,t)$, is continuous almost everywhere and first order differentiable then, by expanding the left hand side, keeping the first order linear terms, and taking the limit as $\delta t \to 0$ we obtain, $$I_i u + I_j v + I_t = 0, \qquad (2)$$

where $I_i$, $I_j$, $I_t$ are the derivatives of the image intensity with respect to i, j, and t, respectively. This equation represents a constraint on the velocity vector (u, v) and is referred to as an optical flow constraint equation. Basically, this equation indicates that the intensity of the corresponding point at the next image should be the same. It is impossible to calculate the optical flow field, (u, v), using Equation (2) alone. Depending on the particular problem, additional constraints can be included. Smoothness constraint, which suggests the motion field varies smoothly, can be expressed as $$S(i,j) = u_i^2 + u_j^2 + v_i^2 + v_j^2 \qquad (3)$$

Combining these two constraints, the following objective function is obtained:

$$L = \iint I_i u + I_j v + I_t di\, dj + \lambda \iint u_i^2 + u_j^2 + v_i^2 + v_j^2 di\, dj. \qquad (4)$$

where λ can be interpreted as a LaGrange multiplier parameter that indicates the relative emphasis on the two components of the objective function. L(i,j) can be easily converted to discrete form by expressing the directional derivatives as first-order differences so that $$L(i,j) = \sum_{ij} \tfrac{1}{4}(u_{i+1,j} - u_{i,j})^2 + (u_{i,j+1} - u_{i,j})^2 + (v_{i+1,j} - v_{i,j})^2 + (v_{i,j+1} - v_{i,j})^2 + \lambda(I_i u_{i,j} + I_j v_{i,j} + I_t)^2 \qquad (5)$$

Differentiating (5) with respect to $u_{i,j}$ and $v_{i,j}$ yields a linear set of equations which can be solved using Gauss-Seidel iteration:

$$u_{i,j}^{n+1} = \bar{u}_{i,j}^n - \frac{I_i \bar{u}_{i,j}^n + I_j \bar{v}_{i,j}^n + I_t}{1 + \lambda(I_i^2 + I_j^2)} I_j \qquad (6)$$

$$v_{i,j}^{n+1} = \bar{v}_{i,j}^n - \frac{I_i \bar{u}_{i,j}^n + I_j \bar{v}_{i,j}^n + I_t}{1 + \lambda(I_i^2 + I_j^2)} I_j \qquad (7)$$

$\bar{u}_{i,j}$ indicates averaging u over the neighboring pixels, $\bar{v}_{i,j}$ indicates averaging v over the neighboring pixels, and n is the iteration number. While $\bar{u}_{i,j}$ and $\bar{v}_{i,j}$ can be started each at zero, as long as frame-to-frame changes are not too pronounced the convergence process will be speeded up by starting from the final motion estimates from the previous frame, rather than zero.

Figure 2:
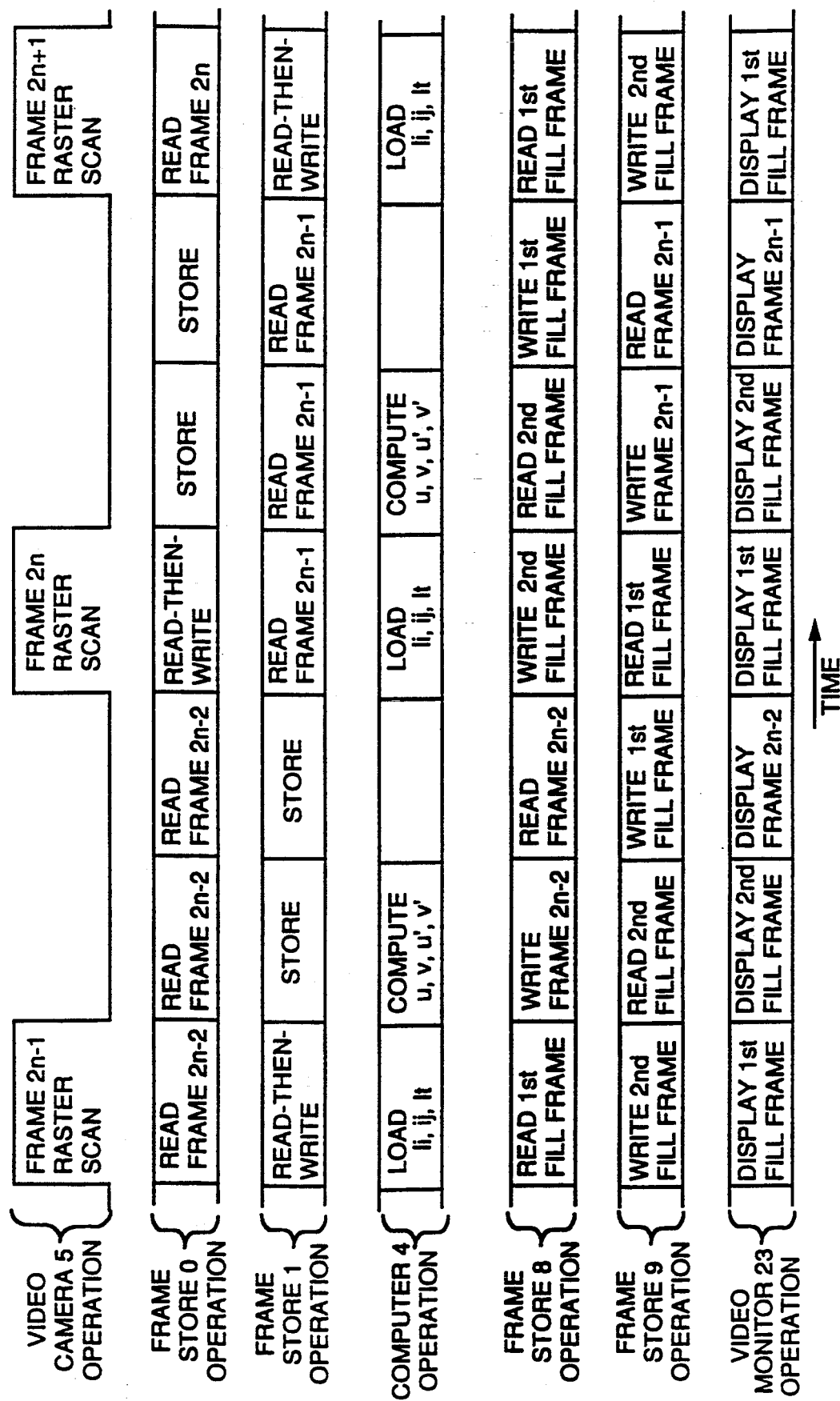
FIG. 2 is a timing diagram of operation of the FIG. 1 fluoroscopic apparatus when interframe interpolation is used to generate fill frames.

FIG. 2 is a timing diagram of the operation of the FIG. 1 fluoroscopic apparatus when interframe interpolation is used to generate fill frames. At such times the video camera 18 supplies successive frames, ... 2n−1, 2n, 2n+1, ... of data during only selected ones of the frame intervals in which the writing and reading of frame stores 8 and 9 of display memory are alternately done. By way of example, the video camera 18 provides raster-scanned frames ... 2n−1, 2n, 2n+1, ... every third time the video monitor 23 has an electronic beam trace a frame on its viewscreen, and so a respective first and second fill-frame must be generated by the frame-filling procedure, for following each of the frames ... 2n−1, 2n, 2n+1, ... of camera-generated samples as digitized by the analog-to-digital digital converter 20. The even-numbered ones of the successive frames ... 2n−1, 2n, 2n+1, ... are written into the frame store 0, and the odd-numbered ones of those frames are written into the frame store 1. The writing of each pixel into one of the frame stores 0 and 1 is the final step of a respective read-then-write process for that respective pixel that reads the pixel data next to be updated for use in calculating a fill frame to be loaded into the one of the display memories 8 and 9 conditioned for being written.

When an even frame (e.g., frame 2n) of camera-generated data is to be grabbed, the previously grabbed even frame of camera-generated data is read from the frame store 0 to support the calculation of a final fill frame, before being written with the most current even frame of camera-generated data to be grabbed. At the same time an even frame of camera-generated data is being written into the frame store 0, the previous odd frame of camera-generated data stored in frame store 1 is being read to provide the data to be subtractively combined in the optical flow computer 4 with the current even frame, in order to generate the temporal gradient $I_t$ of each successive pixel in the time interval between the current, even and preceding, odd frames of camera-recorded image. The frame store 0 also reads the previous scan line of the even frame, as the current scan line of the even frame is being written to provide the optical flow computer 4 data to be subtractively combined with the current scan line of the even frame, in order to generate the spatial gradient $I_j$ of each pixel in the even frame in the direction transverse to the scan lines. During the supplying of the current even frame, the spatial gradient $I_i$ of each pixel in the even frame in the direction parallel to the scan lines is calculated. The gradients $i_i$, $I_j$ and $I_t$ are loaded at pixel scan rate into respective frame stores within the optical flow computer 4.

During the display frame immediately following the one in which the new even frame of camera-generated data is grabbed, the frame stores storing the gradients $i_i$, $I_j$ and $I_t$ are read from, being repeatedly scanned at many times faster than normal pixel scan rate as the optical flow computer 4 iteratively calculates for each pixel the components u and v of velocity and their respective temporal derivatives u' and v' for the interval between the preceding (odd) and current (even) frames. The results of the computations during this frame, when display memory is being updated with the previously grabbed odd frame, would be available from computer 4 during the next display frame, but are not used until three display frames later. During this second display frame after grabbing the new even frame of camera-generated data, the stores for the u and v data are scanned at normal pixel scan rate to provide for the generation of the u, v, u' and v' data needed for calculating the first fill frame based on the most recent odd frame of camera-generated data as read from the frame store 1. This first fill frame based on the most recent odd frame of camera-generated data is written into the one of frame stores 8 and 9 other than the one the most recent odd frame of camera-generated data is being read from.

When an odd frame of camera-generated data is to be grabbed, the previously grabbed odd frame of camera-generated data is read from the frame store 1 to support the calculation of a final fill frame, before being written with the most current odd frame of camera-generated data to be grabbed. At the same time an odd frame of camera-generated data is being written into the frame store 1, the previous even frame of camera-generated data stored in frame store 0 is being read to provide the data to be subtractively combined in the optical flow computer 4 with the current odd frame, in order to generate the temporal gradient $I_t$ of each successive pixel in the time interval between the current odd and preceding even frames of camera-recorded image. The frame store 1 also reads the previous scan line of the odd frame, as the current scan line of the odd frame is being written to provide the optical flow computer 4 data to be subtractively combined with the current scan line of the odd frame, in order to generate the spatial gradient $I_j$ of each pixel in the odd frame in the direction transverse to the scan lines. During the supplying of the current odd frame, the spatial gradient $I_i$ of each pixel in the odd frame in the direction parallel to the scan lines is calculated. The gradients $i_i$, $I_j$ and $I_t$ are loaded at pixel scan rate into respective frame stores within the optical flow computer 4.

During the display frame immediately following the one in which the new odd frame of camera-generated data is grabbed, the frame stores storing the gradients $i_i$, $I_j$ and $I_t$ are read from, being repeatedly scanned at many times faster than normal pixel scan rate as the optical flow computer 4 iteratively calculates for each pixel the components u and v of velocity and their respective temporal derivatives u' and v'0 for the interval between the preceding (even) and current (odd) frames. The results of the computations during this frame, when display memory is being updated with the previously grabbed even frame, would be available from computer 4 during the next display frame, but are not used until three display frames later. During this second display frame after grabbing the new odd frame of camera-generated data, the stores for the u and v data are scanned at normal pixel scan rate to provide for the generation of the u, v, u' and v' data needed for calculating the first fill frame based on the most recent even frame of camera-generated data as read from the frame store 0. This first fill frame based on the most recent even frame of camera-generated data is written into the one of frame stores 8 and 9 other than the one the most recent even frame of camera-generated data is being read from.

Figure 3:
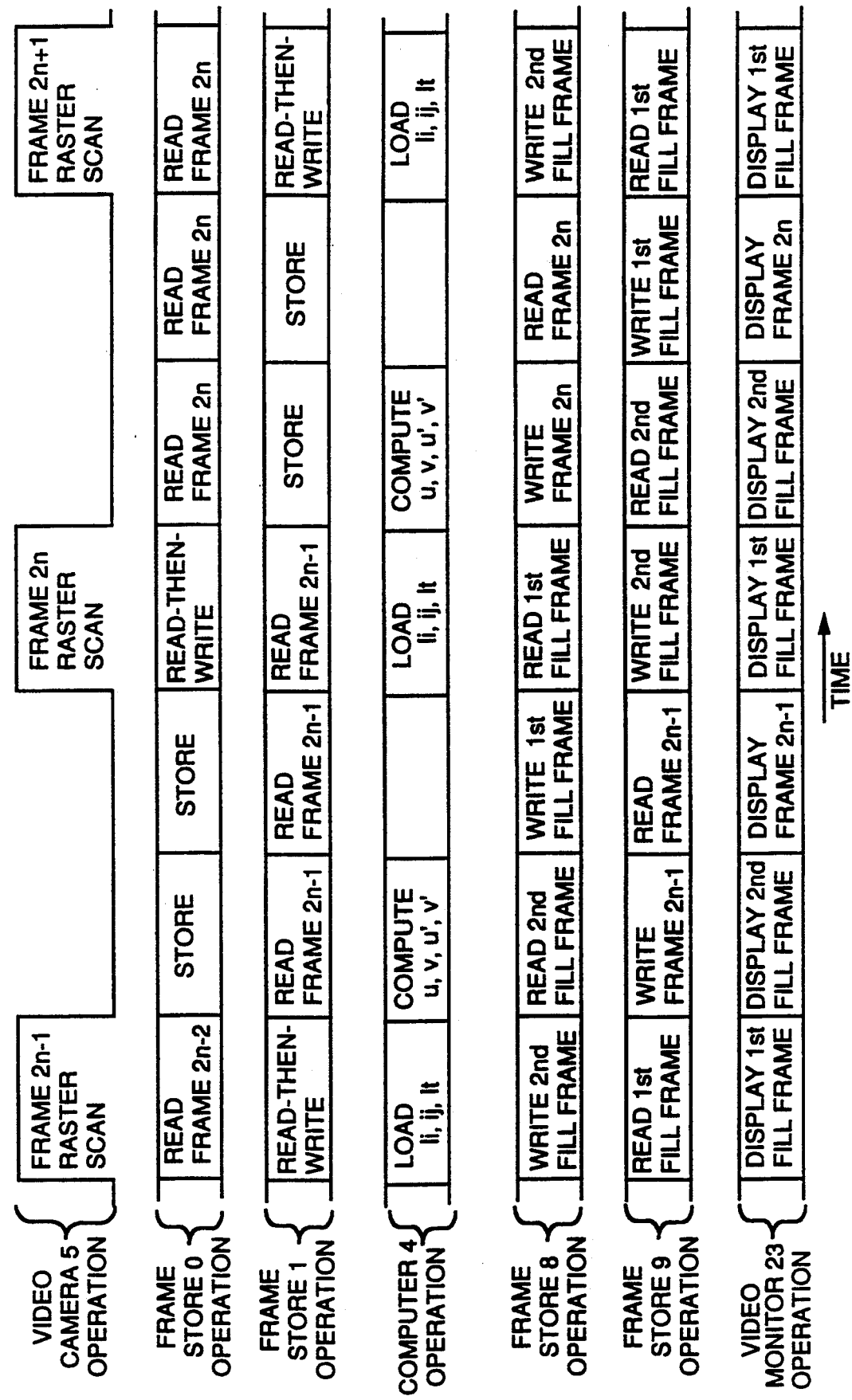
FIG. 3 is a timing diagram of the operation of the FIG. 1 fluoroscopic apparatus when extrapolation from the most recently grabbed frame of image samples is used to generate fill frames.

FIG. 3 is a timing diagram of the operation of the FIG. 1 fluoroscopic apparatus when extrapolation from the most recently grabbed frame of image samples is used to generate fill frames. The even-numbered ones of the successive frames . . . 2n−1, 2n, 2n+1, . . . are written into the frame store 0 after reading therefrom, and the odd-numbered ones of those frames are written into the frame store 1 after reading therefrom. However, of the samples read from the one of the frame stores 0 and 1 being written with the newly grabbed frame of samples, only the samples a scan line back, as read from that frame store and as written back into that frame store, are used by the optical flow computer 4. They are subtractively combined within the computer 4 with the currently written samples to calculate $I_j$ samples for loading at pixel scan rate into a respective frame store in the computer 4. The previous frame of samples is read from the other frame store to provide samples for being subtractively combined within the computer 4 with the currently written samples to calculate $I_t$ samples for loading at pixel scan rate into a respective frame store in the computer 4. Each of the currently written samples is subjected to unit-pixel delay, to generate differentially delayed samples that are subtractively combined within the computer 4 to calculate $I_i$ samples for loading at pixel scan rate into a respective frame store in the computer 4.

The next display frame interval after one of the frame stores 0 and 1 is written with a newly grabbed frame of image samples, it is read from to write one of the frame stores 8 and 9 in the display memory. Meanwhile, the computer 4 iteratively calculates for each pixel the components u and v of velocity and their respective temporal derivatives u' and v' for the interval between the most recently grabbed frame and the previously grabbed frame.

The second display frame interval after one of the frame stores 0 and 1 is written with the most recently grabbed frame of image samples, the one of the frame stores 8 and 9 in the display memory to which this frame of image samples is subsequently written is read from, to supply video samples to the video monitor 23. The other of the frame stores 8 and 9 is written with the first frame of fill samples calculated by extrapolation from the most recently grabbed frame of image samples as read from the one of the frame stores 0 and 1 in which it is stored.

The following display frame interval, the one of the frame stores 8 and 9 written with the first frame of fill samples is read from, to supply video samples to the video monitor 23. The other of the frame stores 8 and 9 is written with the second frame of fill samples calculated by extrapolation from the most recently grabbed frame of image samples as read from the one of the frame stores 0 and 1 in which it is stored. FIG. 3 shows the other of the frame stores 0 and 1 being written with the next grabbed frame of image samples during this frame interval, beginning another cycle of image processing.

The following display frame interval in the ensuing cycle of image processing, the one of the frame stores 8 and 9 written with the second frame of fill samples is read from, to supply video samples to the video monitor 23. The other of the frame stores 8 and 9 is written with the next grabbed frame of image samples as read from the one of the frame stores 0 and 1 in which it is stored.

In the FIG. 3 mode of operation, using extrapolation from the most recently grabbed frame of image samples, that most recently grabbed frame is displayed two display frame intervals later. The most recently grabbed frame is displayed two display frame intervals later, irrespective of how many fill frames are subsequently generated, which is a desirable feature when the ratio of fill frames to frames of actual image data is modulated on a continuing basis. In the FIG. 2 mode of operation using interframe interpolation, display of the most recently grabbed frame of image samples is deferred until the frame interval just preceding that in which the next frame is grabbed. This not only slows the response time of the fluoroscopic apparatus when the ratio of fill frames to frames of actual image data becomes appreciably large. There is also a modulation of image response time when the ratio of fill frames to frames of actual image data is modulated on a continuing basis. This modulation of image response time prevents or greatly complicates the satisfactory closing of a feedback loop including a doctor's hand(s), the fluoroscopic apparatus imaging the hand movements, the doctor's visual system, his brain, his nervous system and the muscles of his hand. This modulation of image response time can be countered by introducing a complementary number of additional frames of delay to obtain uniform delay in display, but this may require a substantial number of additional frame stores and makes response time of the frame-filling apparatus uniformly slow.

FIG. 4 shows the circuitry for calculating the $I_i$, $I_j$ and $I_t$ gradients. A digital subtractor 24 calculates each sample of $I_i$ by subtracting a sample descriptive of the most recent previous pixel in the current scan line, as supplied from a clocked latch 90, from a sample descriptive of the current pixel in the current scan line, as supplied from the analog-to-digital converter 20. The $I_i$ sample, which is the spatial gradient of the current pixel in the i direction parallel to scan lines, is written to a banked frame store 91 for $I_i$ samples; then, the latch 90 is clocked to update its contents to the current pixel in the current scan line. A digital subtractor 25 calculates each sample of $I_j$ by subtracting from a sample descriptive of the current pixel in the current scan line the corresponding sample in the previous scan line, as read from one of the frame stores 0 and 1 via read/write control circuitry 6 for camera memory. The $I_j$ sample, which is the spatial gradient of the current pixel in the j direction perpendicular to scan lines, is written to a banked frame store 92 for $I_j$ samples. A digital subtractor 26 calculates each sample of $I_t$ by subtracting from a sample descriptive of the current pixel in the current scan line the corresponding sample in the previous frame, as read from one of the frame stores 0 and 1 via read/write control circuitry 6 for camera memory. The $I_t$ sample, which is the temporal gradient of the current pixel, is written to a banked frame store 93 for $I_j$ samples.

The samples descriptive of the pixel in the previous scan line read to the subtractor 25 and the signal descriptive of the pixel in the previous frame read to the subtractor 26 are read from different ones of the frame stores 0 and 1 forming the camera memory, and the provisions for doing this will now be considered. The frame store 0 has a bank 0Φ0 for storing even scan lines of even fields and a bank 0Φ1 for storing odd scan lines of even fields; and the frame store 1 has a bank 1Φ0 for storing even scan lines of odd fields and a bank 1Φ1 for storing odd scan lines of odd fields. Addressing of the four banks in the i dimension is done parallelly using the output count from a pixel counter used as a horizontal digital scan generator 64, shown in FIG. 9. Addressing of the two banks in each of the frame stores 0 and 1 in the j direction is done to provide continuous scanning of the current and previous scan lines in memory without permutation, proceeding from the output count of a line counter used as a vertical digital scan generator 65, shown in FIG. 9. This sort of addressing can be done, for example, as described by L. A. Christopher et alii in U.S. Pat. No. 4,460,958 issued Jul. 17, 1984 and entitled "WINDOW-SCANNED MEMORY". The concurrent availability of two scan lines in the memories 0 and 1 allows for the one being written into to be read from one scan line later to supply the signal descriptive of the pixel in the previous scan line.

A grabbed-frame counter 27, shown in FIG. 4 and located in the master control circuitry 2 of FIG. 1, is arranged for modulo-two counting of the grabbed frames of video which, as shown in FIG. 1, are supplied from the video camera 18 to the analog-to-digital converter 20 and thence through the read/write control circuitry 6 for camera memory to one of the frame stores 0 and 1 and to the optical flow computer 4. A modulo-two scan line counter 28, shown in FIG. 4 and located in the master control circuitry 2 of FIG. 1, is arranged for modulo-two counting of the successive scan lines in each frame. The modulo-two scan line counter 28 may be provided by an appropriate counter stage in the vertical digital scan generator 65 shown in FIG. 9. A single grabbed-frame counter 27 and a single modulo-two scan line counter 28 serve as control signals for a camera-memory write multiplexer 29 and a camera-memory read multiplexer 30. The camera-memory write multiplexer 29 receives as its input signal the sample descriptive of the current pixel in the current scan line, as supplied from the analog-to-digital converter 20.

When the grabbed-frame counter 27 count is ZERO, the banked frame store 0 shown in FIG. 1 as storing the even grabbed frames of camera 18 video samples after their digitization is written into with each successive one of those samples describing a current pixel; and the banked frame store 1 shown in FIG. 1 as storing the odd grabbed frames of camera 18 video samples after their digitization is read from, to provide the signal descriptive of the correspondingly-located pixel in the previous frame. Responsive to the modulo-two count from the grabbed-frame counter 27 being ZERO and to the modulo-two count from the modulo-two line counter 28 being ZERO, the multiplexer 29 selects its input signal as data to be written into the bank 0Φ0 of the frame-store 0; the multiplexer 30 selects, as subtrahend input signal for the subtractor 25, data read from the bank 0Φ1 of the frame-store 0 as the signal descriptive of the pixel in the previous scan line that is located in correspondence with the current pixel; and the multiplexer 30 selects, as subtrahend input signal for the subtractor 26, data read from the bank 1Φ0 of the frame-store 1 as the signal descriptive of the pixel in the previous frame that is located in correspondence with the current pixel. Responsive to the modulo-two count from the grabbed-frame counter 27 being ZERO and to the modulo-two count from the modulo-two line counter 28 being ONE, the multiplexer 29 selects its input signal as data to be written into the bank 0Φ1 of the frame-store 0; the multiplexer 30 selects, as subtrahend input signal for the subtractor 25, data read from the bank 0Φ0 of the frame-store 0 as the signal descriptive of the pixel in the previous scan line; and the multiplexer 30 selects, as subtrahend input signal for the subtractor 26, data read from the bank 1Φ1 of the frame-store 1 as the signal descriptive of the pixel in the previous frame.

When the grabbed-frame counter 27 count is ONE, the banked frame store 1 shown in FIG. 1 as storing the odd frames of camera 18 video samples after their digitization is written into with each successive one of those samples describing a current pixel; and the banked frame store 0 shown in FIG. 1 as storing the even frames of camera 18 video samples after their digitization is read from, to provide the signal descriptive of the correspondingly-located pixel in the previous frame. Responsive to the modulo-two count from the grabbed-frame counter 27 being ONE and to the modulo-two count from the modulo-two line counter 28 being ZERO, the multiplexer 29 selects its input signal as data to be written into the bank 1Φ0 of the frame-store 1; the multiplexer 30 selects, as subtrahend input signal for the subtractor 25, data read from the bank 1Φ1 of the frame-store 1 as the signal descriptive of the pixel in the previous scan line; and the multiplexer 30 selects, as subtrahend input signal for the subtractor 26, data read from the bank 0Φ0 of the frame-store 0 as the signal descriptive of the Φ-phase pixel in the previous frame. Responsive to the modulo-two count from the grabbed-frame counter 27 being ONE and to the modulo-two count from the modulo-two line counter 28 being ONE, the multiplexer 29 selects its input signal as data to be written into the bank 1Φ1 of the frame-store 1; the multiplexer 30 selects, as subtrahend input signal for the subtractor 25, data read from the bank 1Φ0 of the frame-store 1 as the signal descriptive of the pixel in the previous scan line; and the multiplexer 30 selects, as subtrahend input signal for the subtractor 26, data read from the bank 0Φ1 of the frame-store 0 as the signal descriptive of the pixel in the previous frame.

Figure 6:
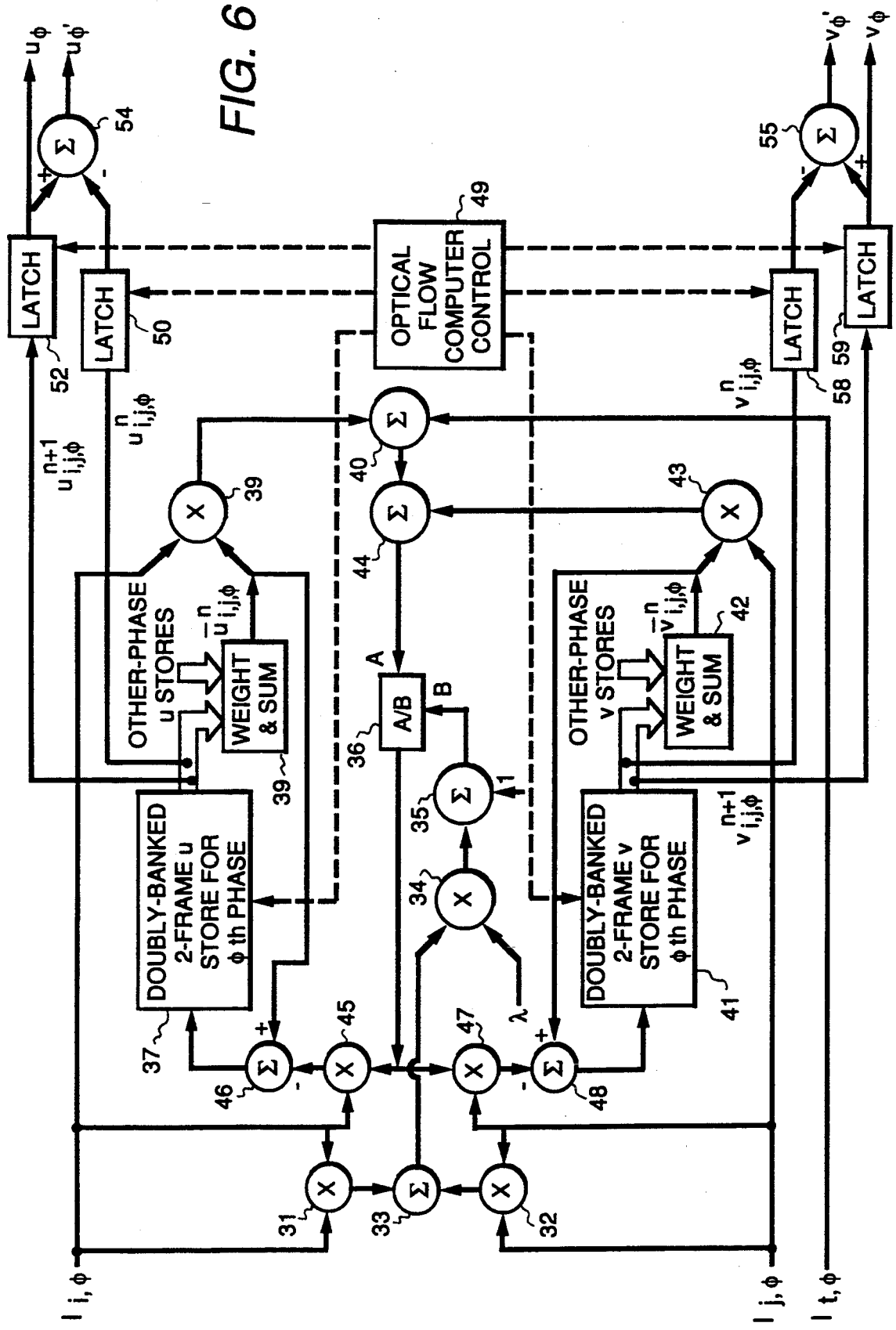
FIG. 6 is a schematic diagram of apparatus for calculating the orthogonal components of the pixel velocity vector and their temporal derivatives for pixels of one spatial phase.

The frame store 91 for $I_i$ values, the frame store 92 for $I_j$ values and the frame store 93 for $I_t$ values are banked so that during the display frame interval next after the display frame interval that they are written at normal raster scan rate they can be read at a relatively high rate, to support the Gauss-Seidel iterations of Equations (6) and (7) being carried out many times in the FIG. 6 circuitry. In the FIG. 6 circuitry, it is assumed that the Gauss-Seidel iterations are carried out on a polyphase basis using sixteen spatial phases in the i direction; and, accordingly, the FIG. 6 circuitry is replicated sixteen-fold. During the next display frame interval after that during which a frame is grabbed, the optical flow computer 4 is supplied relatively-high-rate raster scan addresses for reading the frame store 91 for $I_i$ values, for reading the frame store 92 for $I_j$ values, for reading the frame store 93 for $I_t$ values, for reading and writing submemories 37 of a two-frame store for u values and for reading and writing submemories 41 of a two-frame store for v values. The relatively-high-rate raster scan addresses are generated by horizontal and vertical digital scan generators especially provided for this purpose. These horizontal and vertical digital scan generators are clocked at a multiple (e.g., sixteen times) of the clocking rate for horizontal and vertical digital scan generators 64 and 65 shown in FIG. 9, which horizontal and vertical digital scan generators 64 and 65 control the clocking of the frame stores 0 and 1 in camera memory and the frame stores 8 and 9 in display memory. The horizontal and vertical digital scan generators 64 and 65 also control the raster scanning of the frame stores 91, 92 and 93 during their being written and the raster scanning of the two-frame stores for u and v values when they are read during the calculation of pixel displacements during display frames other than those just after a frame is grabbed.

Figure 5:
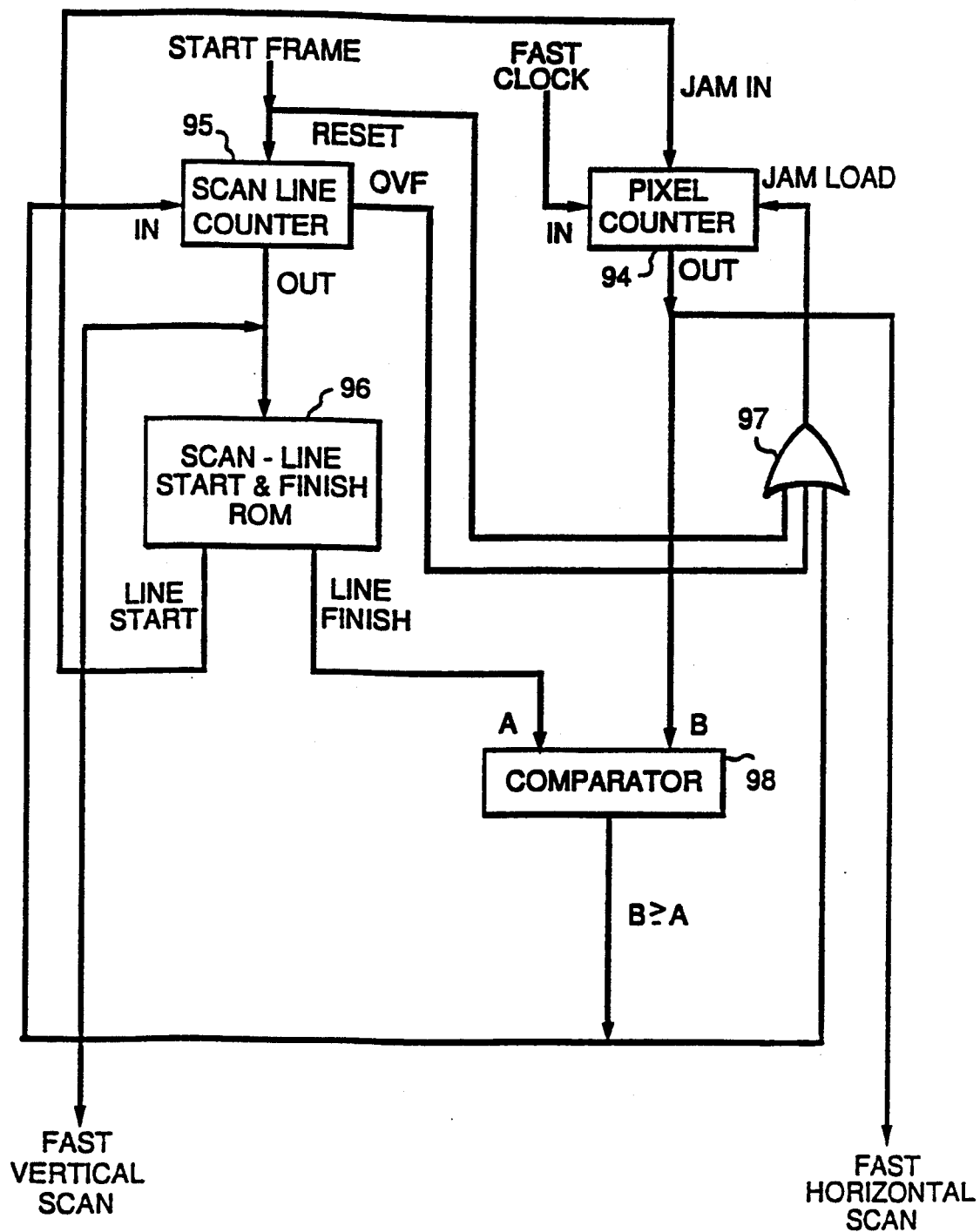
FIG. 5 is a schematic diagram of horizontal and vertical digital scan generation circuitry for the optical flow computer in the FIG. 1 fluoroscopic apparatus.

FIG. 5 shows circuitry that can generate the relatively-high-rate raster scan addresses. The high-rate horizontal raster scan addresses are generated as the count output of a pixel counter 94, and the high-rate vertical raster scan addresses are generated as the count output of a scan line counter 95. Counters 94 and 95 are nine-stage binary counters, assuming a 512 pixel by 512 scan line active display field. The pixel scan counter 94 counts a fast clock signal that is several times the normal pixel scan rate during display. Owing to the light diaphragm 19 and optics 17 between the image intensifier 16 and the video camera 18, the fluoroscopic images of interest appear within a circular area inscribed within the video monitor screen or within a circle with flattened sides; that is, there is no useful information in the corners of the display. Accordingly, the number of iterative calculations the optical flow computer 4 can make within a display frame interval following frame grab for a given-rate fast clock signal can be increased if the corners of the display are not scanned during the calculations of optical flow. A read-only memory (ROM) 96 addressed by the scan line count from the counter 95 stores the horizontal start and finish coordinates for the scanning windows in the memories 37, 41, 91, 92 and 93 for each successive line of scan. The horizontal start coordinate currently supplied from the ROM 96 are jam-loaded into the pixel counter 94 responsive to a JAM LOAD command being received by the counter. The JAM LOAD command is generated as the output signal of a OR gate 97, responsive to a START FRAME command that resets the scan line counter 95 to zero scan line count, or to count overflow being reached by the scan line counter 95, or to a ONE output from a digital comparator 98. The pixel counter 94 counts forward from this horizontal start coordinate, and the pixel count is supplied to the digital comparator 98 for comparison with the horizontal finish coordinate currently supplied from the ROM 96. When the pixel count from the pixel counter 94 reaches that horizontal finish coordinate, the comparator 98 output signal changes from ZERO to ONE. This ONE advances the scan line count supplied from the counter 95 by one, and as applied as input signal to OR gate 97 generates the JAM LOAD command that causes the horizontal start coordinate of this next scan line to be jam-loaded into the pixel counter 94.

FIG. 6 shows the portion of the optical flow computer 4 in which are made the calculations of $u_\Phi$ and $v_\Phi$, the $\Phi^{th}$ spatial phases of the components u and v of the velocity vector in the i and j directions. The first derivatives with time of $u_\Phi$ and $v_\Phi$ are also calculated in the portion of the optical flow computer 4 shown in FIG. 6. For the sake of simplifying the successive scanning of the pixels, the Gauss-Seidel iterations are assumed to be carried out the same number of times for each pixel, the number of times (e.g., sixteen times) being chosen high enough to converge the last u estimates and to converge the last v estimates for each pixel. The calculations proceed, beginning with the gradients $I_{i,\Phi}$, $I_{j,\Phi}$ and $I_{t,\Phi}$ supplied from the frame stores 91, 92 and 93 of FIG. 4.

The square of $I_{i,\Phi}$ is generated by a digital multiplier 31 that multiplies $I_{i,\Phi}$ by itself; the square of $I_{j,\Phi}$ is generated by a digital multiplier 32 that multiplies $I_{j,\Phi}$ by itself; the sum of the squares of $I_{i,\Phi}$ and of $I_{j,\Phi}$ is subsequently generated by a digital adder 33; the sum of the squares of $I_{i,\Phi}$ and of $I_{j,\Phi}$ is multiplied by a factor λ in a digital multiplier 34; and the resulting product is augmented by unity in a digital adder 35 to generate a divisor signal for a digital divider 36. The factor λ is chosen according to the noisiness of the image, being chosen smaller for noisier images, and has range from just less than one to as high as fifty in the inventors' investigations. The choice of the factor λ can be further adjusted according to the strength of the gradient in the optical flow field, being chosen smaller for larger gradients. The divisor signal supplied to the divider 36 corresponds to the denominator of fractions found in equations (6) and (7) above.

The previous estimates of $u_\Phi$ are stored in a submemory 37 that is the $\Phi^{th}$ submemory of zeroeth through fifteenth submemories of the memory for storing the previous estimates of u for each of the pixels in two frames. The two frames in the submemory 37 are arranged to be concurrently available from respective halves of the submemory 37; and each half of the submemory 37 is subdivided in both the i and j directions into a plurality of banks, which banks can be considered to be arrayed by row and by column in accordance with respective moduli of submemory addresses in the i and j directions. The two frames stored in the submemory 37 are arranged to be concurrently window-scanned without permutation of samples in either the i direction or the j direction. The bank of the submemory 37 chosen for writing the most recent estimate of $u_\Phi$ for the most recent $\Phi$-phase pixel after reading the previous estimate of $u_\Phi$ for that pixel (or, at the beginning of a cycle of calculations, for the pixel a frame earlier) is one which is currently in a position near the center of the scanning window, the choice being the same for each of the zeroeth through fifteenth submemories for storing estimates of u. The previous estimate of $u_\Phi$ for the most recent $\Phi$-phase pixel is read from the submemory 37 concurrently with estimates of u for neighboring pixels being read from submemory 37 and the other submemories storing estimates of u. The estimates of u for the most recent $\Phi$-phase pixel and its neighboring pixels are supplied to a weighted summation circuit 38 to implement a low-pass filter that is three-dimensional in the space-time continuum of video samples. A digital multiplier 39 multiplies $I_{i,\Phi}$ by the response of the weighted summation circuit 38 to generate one of the product terms in the numerator of the fraction in equations (6) and (7) above, which product term is added to $I_{i,\Phi}$ in a digital adder 40.

The previous estimates of $v_\Phi$ are stored in a submemory 41 that is the $\Phi^{th}$ of zeroeth through fifteenth submemories of the memory for storing the previous estimates of v for each of the pixels in a frame. The submemory 41 is subdivided in both the i and j directions into a plurality of banks the same as the submemory 37 and is arranged to be window-scanned without permutation of samples in either the i direction or the j direction. The bank of the submemory 41 chosen for writing the most recent estimate of $v_\Phi$ for the most recent $\Phi$-phase pixel after reading the previous estimate of $v_\Phi$ for that pixel (or, at the beginning of a cycle of calculations, for the pixel a frame earlier) is one which is currently in a position near the center of the scanning window, the choice being the same for each of the zeroeth through fifteenth submemories for storing estimates of v and the same as made for each of the zeroeth through fifteenth submemories for storing estimates of u. The previous estimate of $v_\Phi$ for the most recent $\Phi$-phase pixel is read from the submemory 41 concurrently with estimates of v for neighboring pixels being read from submemory 41 and the other submemories storing estimates of v. The estimates of v for the most recent $\Phi$-phase pixel and its neighboring pixels are supplied to a weighted summation circuit 42 to implement a low-pass filter that is three-dimensional in the space-time continuum of video samples. A digital multiplier 43 multiplies $I_{j,\Phi}$ by the response of the weighted summation circuit 42 to generate another of the product terms in the numerator of the fraction in equations (6) and (7) above, which product term is added in a digital adder 44 to the sum output of the adder 40. The sum output signal of the adder 44 is the complete numerator of the fraction in equations (6) and (7), and this sum is supplied to the divider 36 as its dividend input signal.

The divider 36 generates the fractional term appearing in equations (6) and (7). The fractional term is multiplied by $I_{i,\Phi}$ in a digital multiplier 45 to generate a product output signal that is subtracted from the weighted summation circuit 38 output signal in a digital subtractor 46. The resulting difference output signal from the subtractor 46 is the revised estimate of $u_\Phi$ that is written to submemory 37 to replace the previous estimate of $u_\Phi$ for the pixel. The fractional term generated by the divider 36 is multiplied by $I_{j,\Phi}$ in a digital multiplier 47 to generate a product output signal that is subtracted from the weighted summation circuit 42 output signal in a digital subtractor 48. The resulting difference output signal from the subtractor 48 is the revised estimate of $v_\Phi$ that is written to submemory 41 to replace the previous estimate of $v_\Phi$ for the pixel.

At the outset of computing the velocity vector of a pixel, control circuitry 49 for the optical flow computer 4 commands digital latches 50 and 51 to latch the final estimates of $u_\Phi$ and $v_\Phi$ for the corresponding pixel in the previous frame, as read from the submemories 37 and 42 respectively and spatially low-pass filtered by the weighted summation circuits 38 and 43 respectively. At the close of computing the velocity vector of a pixel, the control circuitry 49 commands digital latches 52 and 53 to latch the final estimates of $u_\Phi$ and $v_\Phi$ for the pixel, as read from the submemories 37 and 42 respectively and spatially low-pass filtered by the weighted summation circuits 38 and 43 respectively. A digital subtractor 54 subtracts the contents of latch 50 from the contents of latch 52 to generate the temporal derivative $u_{\Phi}'$ of $u_\Phi$; and a digital subtractor 55 subtracts the contents of latch 51 from the contents of latch 53 to generate the temporal derivative $v_{\Phi}'$ of $u_\Phi$.

Storing two successive frames of $u_\Phi$ samples in submemory 37 and two successive frames of $v_\Phi$ samples in submemory 41 makes it unnecessary to provide frame stores for the $u_{\Phi}'$ and $v_{\Phi'}$ temporal derivatives. At the same time, a greater number of neighboring pixel values is made available to the weighted summation circuits 38 and 41 for use in filtering $u_\Phi$ and $v_\Phi$.

Alternatively, but at the cost of increased digital hardware, one can arrange to make calculations of optical flow more accurate than those possible with the combined apparatus of FIGS. 5 and 6. The calculations by the combined apparatus of FIGS. 5 and 6 presume that the u component of the optical velocity vector of a pixel are the same in both the positive and negative i directions and that the v component of the optical velocity vector of a pixel are the same in both the positive and negative j directions, which presumptions are not always correct. More sophisticated apparatus for determining the spatial gradient $I_i$ calculates it in slightly delayed time based on three successive pixels, a pixel preceding a "current" pixel, the "current" pixel, and a pixel succeeding a "current" pixel. The i-direction spatial gradients between the earlier and the "current" pixels and between the "current" and later pixels are separately calculated. The particular i-direction spatial gradient to be used in the calculations by the FIG. 6 apparatus is chosen according to the positive or negative direction of the velocity vector component $u_\Phi$ for the particular pixel for which calculations are being made. Inserting, after the time-division multiplexer 3, respective scan line stores for the various spatial phases accommodates more sophisticated apparatus for determining the spatial gradient $I_j$ permitting the i-direction spatial gradients between the "current" pixel and the corresponding pixel one line later and the corresponding pixel one line earlier and the "current" pixel to be separately calculated. The particular j-direction spatial gradient to be used in the calculations by the FIG. 6 apparatus is chosen according to the positive or negative direction of the velocity vector component $v_\Phi$ for the particular pixel for which calculations are being made.

Figure 7:
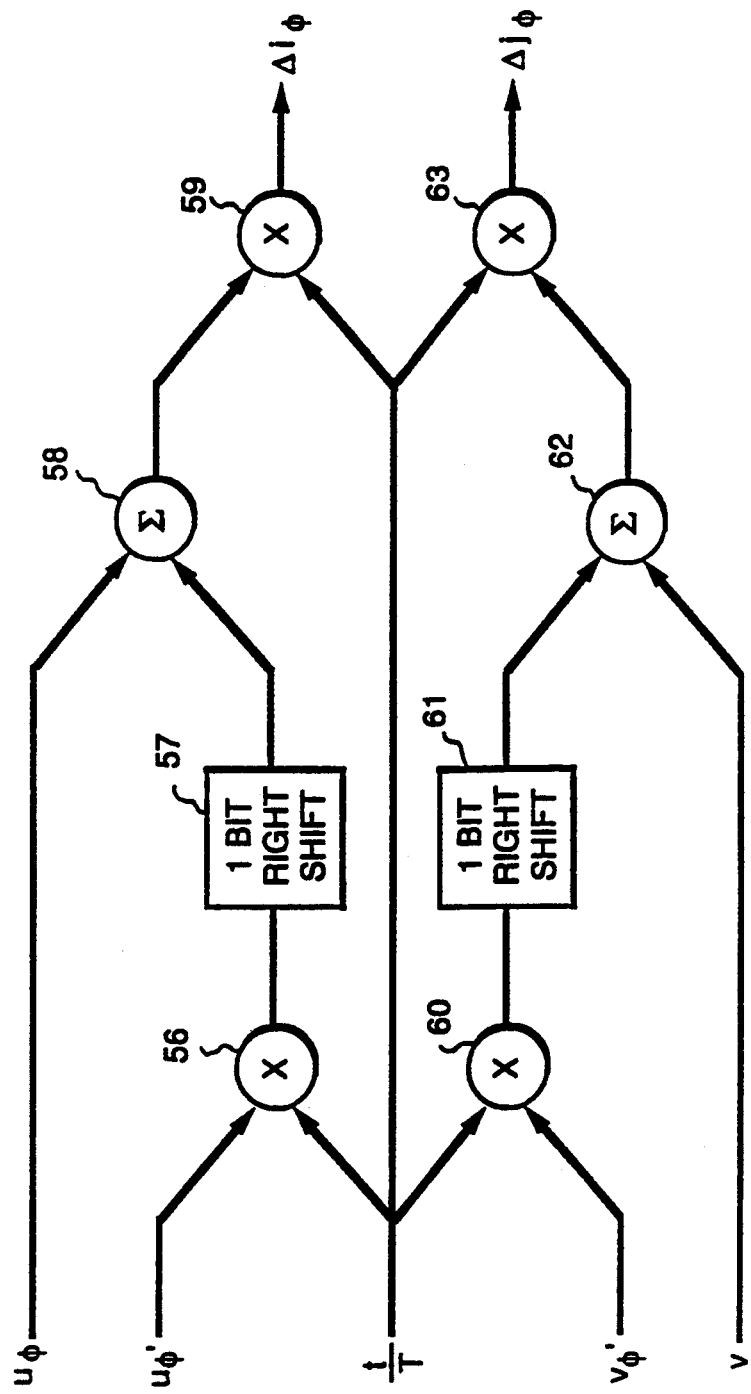
FIG. 7 is a schematic diagram of apparatus for calculating the pixel displacement vector for pixels of one spatial phase, proceeding from the orthogonal components of the pixel velocity vector and their temporal derivatives calculated by the FIG. 6 apparatus.

FIG. 7 shows the digital circuitry for generating the components $\Delta i_\Phi$ and $\Delta j_\Phi$ of the displacement vector for a $\Phi$-spatial-phase pixel, responsive to its $u_\Phi$ and $v_\Phi$ velocity components and to its $u_\phi'$ and $v_\phi'$ acceleration components. A digital representation of the variable $t/T$ defining the time interval between a fill frame and the immediately preceding frame is furnished to the FIG. 7 circuitry from the master control circuitry 2. A digital multiplier 56 multiplies the $u_\phi'$ acceleration component by $t/T$, and the resulting product is halved by a wired shift 57 to generate an addend input signal for a digital adder 58 receiving the $u_\phi$ velocity vector component as an augend input signal. A digital multiplier 59 multiplies the sum output signal from the adder 58 by $t/T$ to generate the component $\Delta i_\phi = u_\phi(t/T) + 2^{-1}u_\phi'(t/T)^2$ of the pixel displacement vector for the $\Phi$-spatial-phase pixel. A digital multiplier 60 multiplies the $u_\phi'$ acceleration component by $t/T$, and the resulting product is halved by a wired shift 61 to generate an addend input signal for a digital adder 62 receiving the $v_\phi$ velocity vector component as an augend input signal. A digital multiplier 63 multiplies the sum output signal from the adder 62 by $t/T$ to generate the component $\Delta j_\phi = v_\phi(t/T) + 2^{-1}v_\phi'(t/T)^2$ of the pixel displacement vector for the $\Phi$-spatial-phase pixel.

Figure 8:
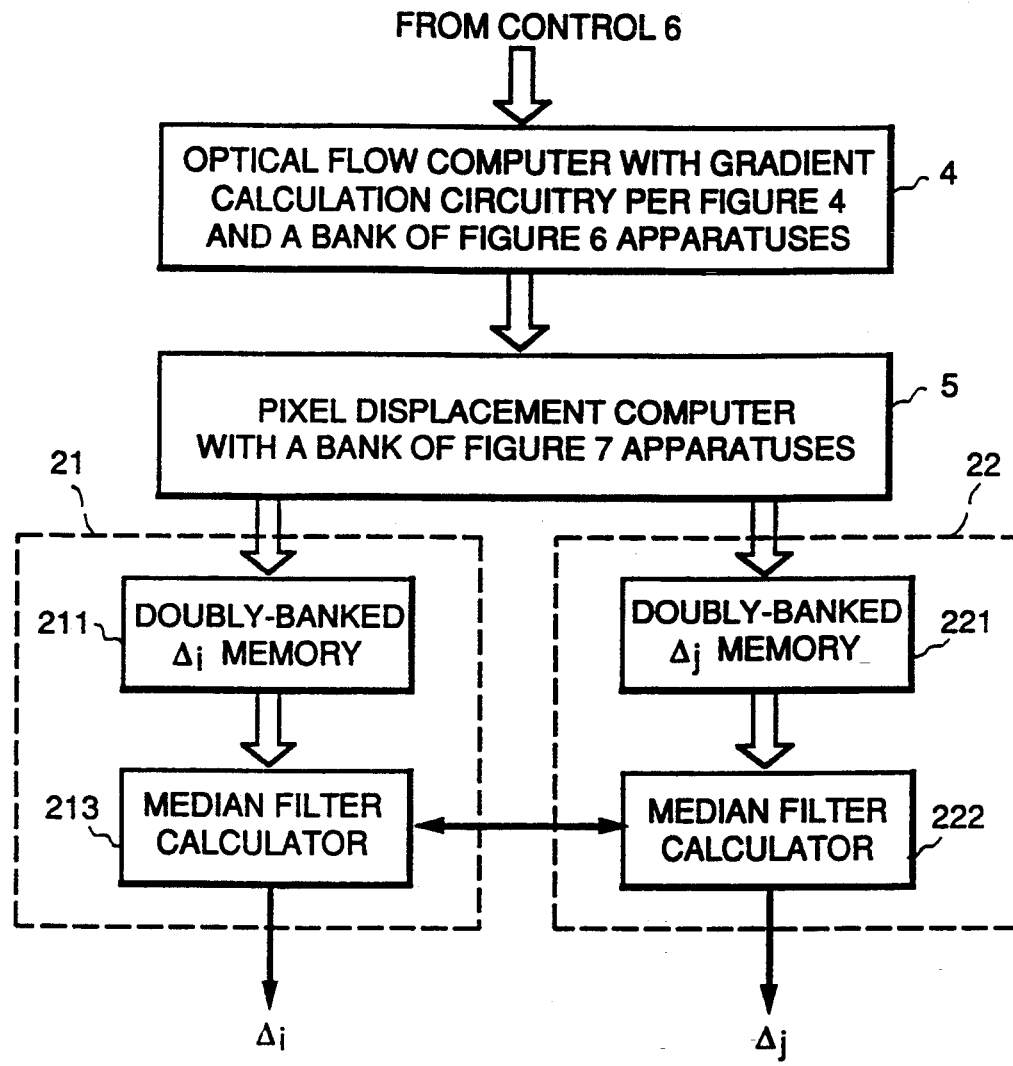
FIG. 8 is a schematic diagram showing more particularly how the parallel calculations of pixel displacements for a plurality of spatial phases, as made by the apparatuses of FIGS. 6 and 7, can be converted to serial format.

FIG. 8 shows in more detail how the orthogonal components of the pixel displacement vectors calculated on a polyphase basis can be converted to serial format in parallel-in/serial-out registers 21 and 22. In FIG. 8 the banked optical flow computer 4 (shown as having gradient calculation circuitry per FIG. 4 and a bank of optical flow calculators each per FIG. 6) is used together with a banked pixel displacement computer 5 (shown as having a bank of pixel displacement calculators each per FIG. 7) to generate on a polyphase basis the orthogonal components of the pixel displacement vectors. To suppress the effect of the occasional pixel displacement vector with an erroneously high amplitude, median filtering is done on the pixel displacement vectors.

Towards this goal, the polyphase components of the pixel displacement vectors in the direction parallel to the display raster scan lines are written in parallel into a doubly-banked memory 211 of a size to accommodate several scan lines of video samples, and the polyphase components of the pixel displacement vectors in the direction transverse to the display raster scan lines are written into a doubly-banked memory 221 of similar size. The double banking of the memory 211 facilitates its supplying a bed of contiguous samples of $u_\phi$ velocity vector component for median filtering; and the double banking of the memory 221 facilitates its supplying a bed of contiguous samples of $v_\phi$ velocity vector component for median filtering. The banking of the memories 211 and 221 into several spatial phases in the direction parallel to the display raster scan lines also facilitates the writing of the polyphase components of the pixel displacement vectors in parallel into these memories. The banking of the memory 211 into several spatial phases in the direction transverse to the display raster scan lines facilitates one scan line of samples of the $u_\phi$ velocity vector component being written thereto while contiguous scan lines of samples of the $u_\phi$ velocity vector component are read therefrom to support the median filtering. Similarly, the banking of the memory 221 into several spatial phases in the direction transverse to the display raster scan lines facilitates one scan line of samples of the $v_\phi$ velocity vector component being written thereto while contiguous scan lines of samples of the $v_\phi$ velocity vector component are read therefrom to support the median filtering. It is preferable from the standpoint of reducing digital hardware that the memories 211 and 221 not be full frame stores. One familiar with the architectures available in digital memory will understand that the memories 211 and 221 can be provided a scrolling polyphase scan in the direction transverse to display scan lines, so that the number of scan lines in each of the memories 211 and 221 can be reduced just to span the median filter kernel or just to span one line or a few lines more the median filter kernel. Reducing the number of scan lines in each of the memories 211 and 221 to span at least one more line than the median filter kernel avoids the need for both reading and writing locations within the same scan line in memory 211 or in memory 221, which reduces speed requirements on these memories.

In the FIG. 8 parallel-in/serial out register 21, the unfiltered $\Delta_i$ sample and its surrounding samples are supplied from the doubly-banked memory 211 to a median filter calculator 212. Similarly, in the FIG. 8 parallel-in/serial out register 22, the unfiltered $\Delta_j$ sample and its surrounding samples are supplied from the doubly-banked memory 221 to a median filter calculator 222. As long as the unfiltered $\Delta_i$ sample does not depart too greatly from all its surrounding samples from memory 211 and as long as the unfiltered $\Delta_j$ sample does not depart too greatly from all its surrounding samples from memory 221, the filtered $\Delta_i$ output sample from the median filter calculator 212 is identical to that unfiltered $\Delta_i$ sample, and the filtered $\Delta_j$ output sample from the median filter calculator 222 is identical to that unfiltered $\Delta_j$ sample. If the unfiltered $\Delta_i$ sample departs too greatly from all its surrounding samples from memory 211, or if the unfiltered $\Delta_j$ sample departs too greatly from all its surrounding samples from memory 221, the filtered $\Delta_i$ output sample from the median filter calculator 212 is identical to the average of the surrounding samples from memory 211, and the filtered $\Delta_j$ output sample from the median filter calculator 222 is identical to the average of those surrounding samples from memory 221. Doing median filtering on the pixel displacement vectors themselves, rather than on $\bar{u}_{i,j}$ and $\bar{v}_{i,j}$ signals in the optical flow computer, appears from the inventors' experiments to be a more robust technique for eliminating isolated erroneous pixel displacement vectors.

Figure 9:
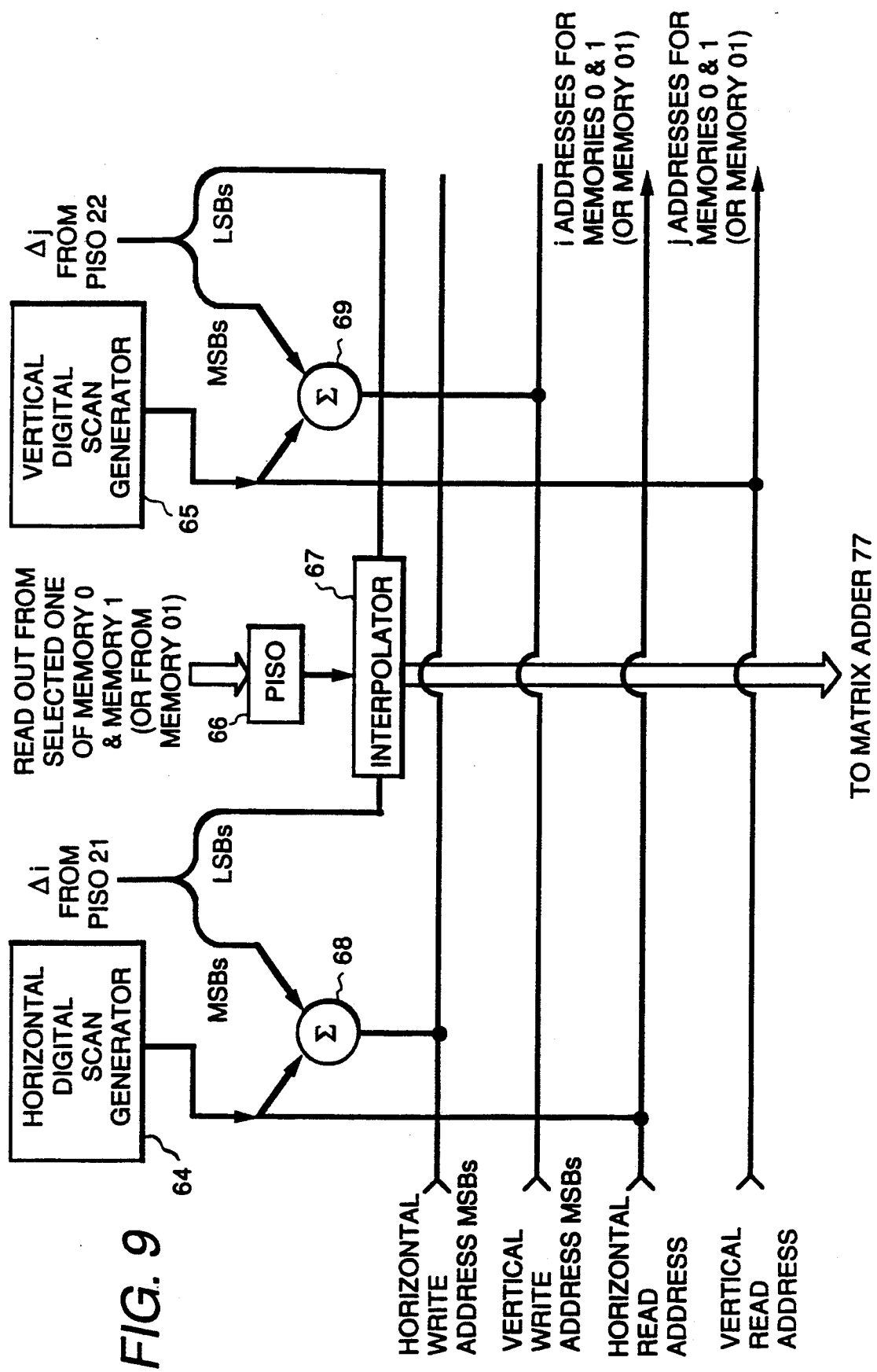
FIGS. 9 and 10 together are a schematic diagram of apparatus, responding to the pixel displacement vectors calculated for the plurality of spatial phases by respective apparatuses per FIG. 7, for modifying actual fluoroscopic image frames to generate intervening fill frames of fluoroscopic image.

FIG. 9 indicates more particularly how the pixel displacement vectors calculated for the plurality of spatial phases by respective apparatuses per FIG. 7 are used in re-mapping a raster-scanned image read from a selected one of the camera memory frame stores 0 and 1 into a modified set of spatial coordinates to be written as a fill frame to a selected one of the display memory frame stores 8 and 9. A horizontal digital scan generator 64 and the vertical digital scan generator 65 generate the horizontal (i) and vertical (j) addresses for both the even-frame store 0 and the odd-frame store 1 in camera memory. The vertical (j) addresses supplied from the vertical digital scan generator 65 are the scan line count in progressive scanning. These vertical (j) addresses are applied to the frame stores 0 and 1 so as to scan two lines concurrently. These vertical (j) addresses are also applied to the one of the frame stores 8 and 9 currently selected for reading video samples on a raster-scanned basis to the video monitor 23. The horizontal digital scan generator 64 counts the number of pixels per scan line in the display to generate the horizontal (i) addresses applied to the one of the frame stores 8 and 9 currently selected for reading video samples on a raster-scanned basis to the video monitor 23, which implements continuous horizontal scanning of that frame store.

As previously noted, the frame stores 0 and 1 in the camera memory receive only the more significant bits of the horizontal (i) addresses generated by the horizontal digital scan generator 64, the sixteen least significant bits not being included in the horizontal (i) addresses as applied to the frame stores 0 and 1. Accordingly, the 16-sample-wide, 2-sample-high scanning windows supplied from the frame stores 0 and 1 during their reading are not continuously scanned, but rather are jump-scanned. A parallel-in/serial-out register 66 converts the successive 16-sample-wide, 2-sample-high scanning windows supplied from the frame stores 0 and 1 to continuous digital scanning of the current scan line. The serial video samples from the PISO register 66 are supplied as input signal to an interpolator 67.

The components $\Delta i$ and $\Delta j$ of the pixel displacement vector for the current pixel are available from the parallel-in/serial-out registers 21 and 22, respectively, as shown in FIG. 1. In FIG. 9 a digital adder 68 adds the $\Delta i$ component of pixel displacement to the horizontal (i) addresses generated by the horizontal digital scan generator 64, and a digital adder 69 adds the $\Delta j$ component of pixel displacement to the vertical (j) addresses generated by the vertical digital scan generator 65. The sum outputs of the adders 68 and 69 provide the integer portions of the horizontal (i) addresses and the vertical (j) addresses of the current pixel as it appears in the current fill frame, which are used to address the one of the frame stores 8 and 9 in which the current fill frame is being written by accumulation of individual shifted pixels. The fractional portions of the $\Delta i$ and $\Delta j$ pixel displacements correspond to what the fractional portions of the sum outputs of the adders 68 and 69 would be if the additions of the $\Delta i$ and $\Delta j$ pixel displacements to scan generator 64 and 65 addresses were performed full-width—that is, additional resolution in regard to the spatial positioning of the current pixel in the fill frame. Accordingly, the fractional portions of the $\Delta i$ and $\Delta j$ pixel displacements are supplied to the interpolator 67 to control its operation in compensating for fractional-pixel offsets between scan coordinates in fill frames and in camera-data frames.

Figure 10:
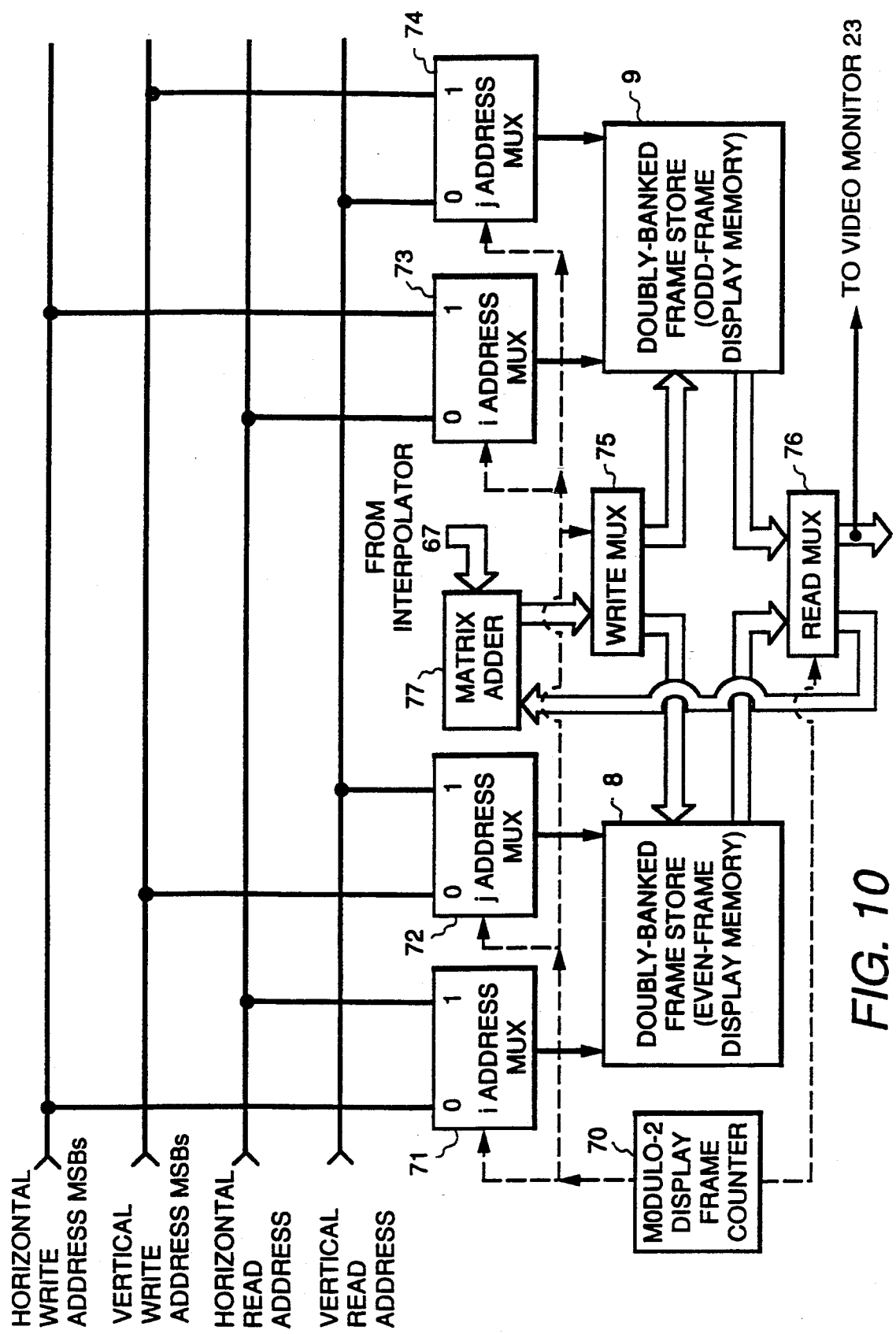

FIG. 10 shows in greater detail how the frame stores 8 and 9 in the display memory are alternately written and read in successive frame scan intervals. A counter 70 counts the successive display frames modulo-two to generate control signal for the horizontal (i) address multiplexer 71 for the frame store 8, for the vertical (j) address multiplexer 72 for the frame store 8, for the horizontal (i) address multiplexer 73 for the frame store 9, for the vertical (j) address multiplexer 74 for the frame store 9, for a write multiplexer 75 selecting the one of the frame stores 0 and 1 to be written with the 2×2 sum output signal of a matrix adder 77, and for a read multiplexer 76 selecting the one of the frame stores 0 and 1 to be read to the video monitor 23 and the one to be read to the matrix adder 77 as its 2×2 augend input signal. The matrix adder 77 receives its 2×2 addend input from the interpolator 67 of FIG. 9.

When the counter 70 count is ZERO, the multiplexers 71 and 72 select the sum output signals from the adders 68 and 69 as random-access horizontal (i) and vertical (j) write addresses for the frame store 8; and the multiplexers 73 and 74 select raster-scanned horizontal (i) and vertical (j) write addresses from the horizontal digital scan generator 64 and from the vertical digital scan generator 65, respectively, for application to the frame store 9. The frame stores 8 and 9 are doubly banked so that a 2-sample-wide, 2-sample-high window is accessible in each. The read multiplexer 76 selects the sample window from the frame store 9 for reading to generate four parallel streams of video data, one of which raster-scanned streams of video data is supplied to the video monitor 23. The read multiplexer 76 also selects the sample window from the frame store 8 for reading (in a succession of read-then-write operations) to generate four parallel streams of video data supplied as 2×2 augend input signal to the matrix adder 77. The write multiplexer 75 selects the randomly-accessed frame store 8 to be written with the 2×2 sum output signal from the matrix adder 77. The interpolator 67 apportions the pixel read from the selected one of the frame stores 0 and 1 to its 2×2 window output signal in accordance with the fractional portions of the horizontal (i) and vertical (j) random access addresses generated by the adders 68 and 69. The matrix adder 77 adds the apportioned current pixel data to the previous contents of the frame store 8, as furnished therefrom via the read multiplexer 79, to generate a window of amended pixel samples as its 2×2 sum output signal. The 2×2 sum output signal from the matrix adder 77 is written back into the previously read locations of the randomly-accessed frame store 8 via the write multiplexer 75, writing over the previous data in those locations.

During its randomly-accessed writing, then, each storage location in the frame store 8 is operated as an accumulator for successive pixel data entered thereinto, which pixels are apt to be at spatial locations not mapped to integral memory address coordinates and so must be apportioned into components written into memory locations located at integral memory address coordinates.

When the counter 70 count is ONE, the multiplexers 71 and select the sum output signals from the adders 68 and 69 as random-access horizontal (i) and vertical (j) write addresses for the frame store 9; and the multiplexers 73 and 74 select raster-scanned horizontal (i) and vertical (j) write addresses from the horizontal digital scan generator 64 and from the vertical digital scan generator 65, respectively, for application to the frame store 8. The read multiplexer 76 selects the sample window from the frame store 8 for reading to generate four parallel streams of video data, one of which raster-scanned streams of video data is supplied to the video monitor 23. The read multiplexer 76 also selects the sample window from the frame store 9 for reading a 2×2 augend input signal to the matrix adder 77. The write multiplexer 75 selects the randomly-accessed frame store 9 to be written with the 2×2 sum output signal from the matrix adder 77. The matrix adder 77 adds the apportioned current pixel data from the interpolator 67 to the previous contents of the frame store 9, as furnished therefrom via the read multiplexer 76, written back into the previously read locations of the randomly-accessed frame store 9 via the write multiplexer 75. During its randomly-accessed writing, then, each storage location in the frame store 9 is operated as an accumulator for successive pixel data entered thereinto.

Figure 11:
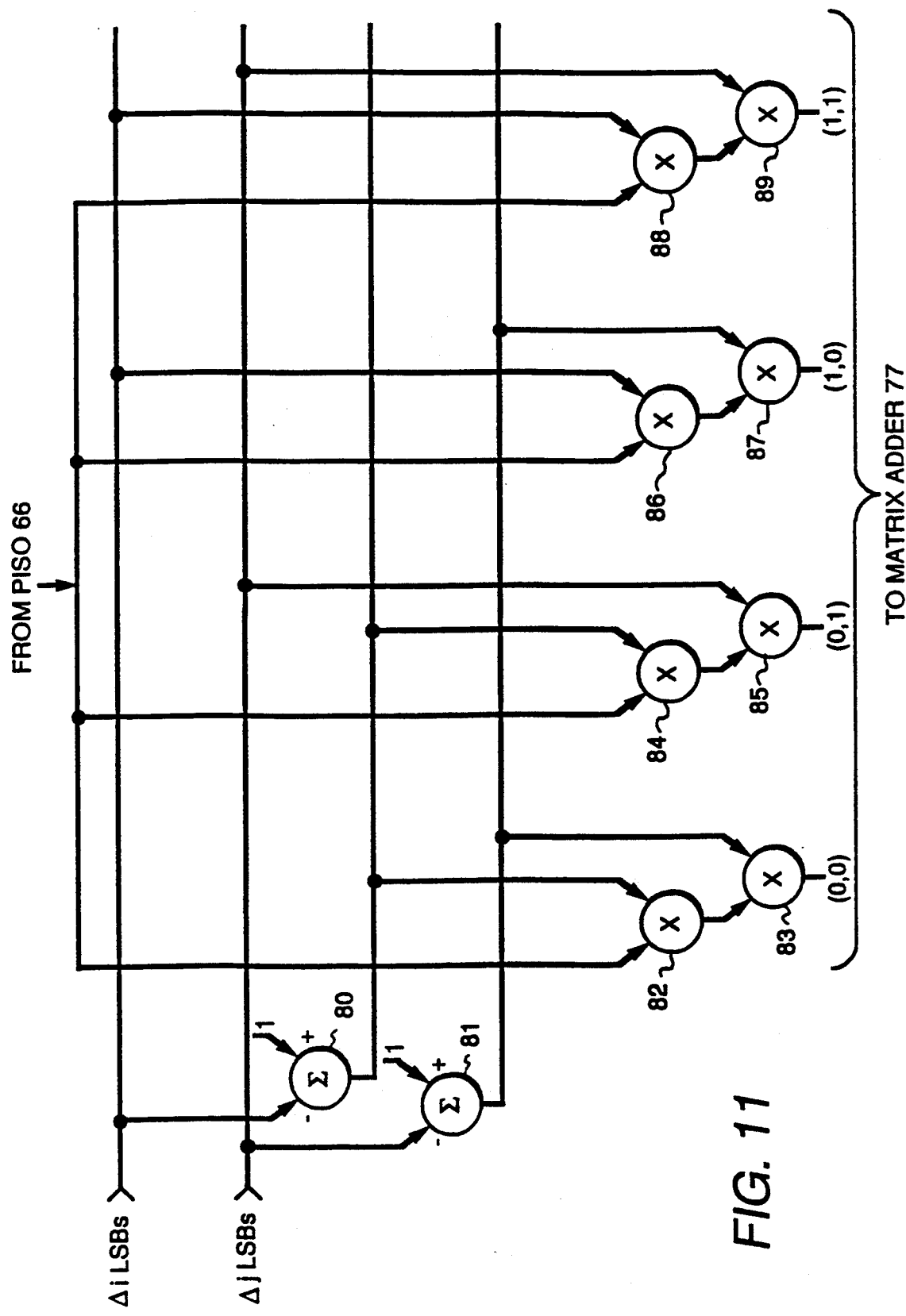
FIG. 11 is a schematic diagram of an interpolator used in the FIG. 9 apparatus.

FIG. 11 shows the structure of the interpolator 67 in greater detail. The less significant bits of $\Delta i$ are subtracted from unity in a digital adder 80, and the less significant bits of $\Delta j$ are subtracted from unity in a digital adder 81. Multiplying in a digital multiplier 82 the video sample supplied from the PISO register 66 by the difference output signal of the subtractor 80, then multiplying the resulting product in a digital multiplier 83 by the difference output signal of the subtractor 81, generates a product that is used to increment to the value of the current pixel (0,0) in the fill frame. Multiplying in a digital multiplier 84 the video sample supplied from the PISO register 66 by the difference output signal of the subtractor 80, then multiplying the resulting product in a digital multiplier 85 by the less significant bits of $\Delta j$ generates a product that is used to increment to the value of the next-after-current pixel (1,0) in the fill frame. Multiplying in a digital multiplier 86 the video sample supplied from the PISO register 66 by the less significant bits of $\Delta i$, then multiplying the resulting product in a digital multiplier 87 by the difference output signal of the subtractor 81, generates a product that is used to increment to the value of the pixel (0,1) one scan line later in the fill frame than the current pixel (0,0). Multiplying in a digital multiplier 88 the video sample supplied from the PISO register 66 by the less significant bits of $\Delta i$, then multiplying the resulting product in a digital multiplier 89 by the less significant bits of $\Delta j$, generates a product that is used to increment to the value of the pixel (1,1) one scan line and one pixel later in the fill frame than the current pixel (0,0). While conventional digital multipliers 82–89 are shown for performing the interpolation, interpolation can be performed at pixel scan rates on a bit-sliced basis, analogously to the linear interpolator described by Christopher H. Strolle in his U.S. Pat. No. 4,446,529 issued May 1, 1984 and entitled "LINEAR INTERPOLATION BETWEEN REGULARLY SPACED DIGITAL SAMPLES". While the writing of fill frames into display memory has been described as using simple linear interpolation, which is generally satisfactory, more complex interpolation functions can be used by doubly banking the frame stores 8 and 9 so as to provide a larger than 2×2 sample window.

Figure 12:
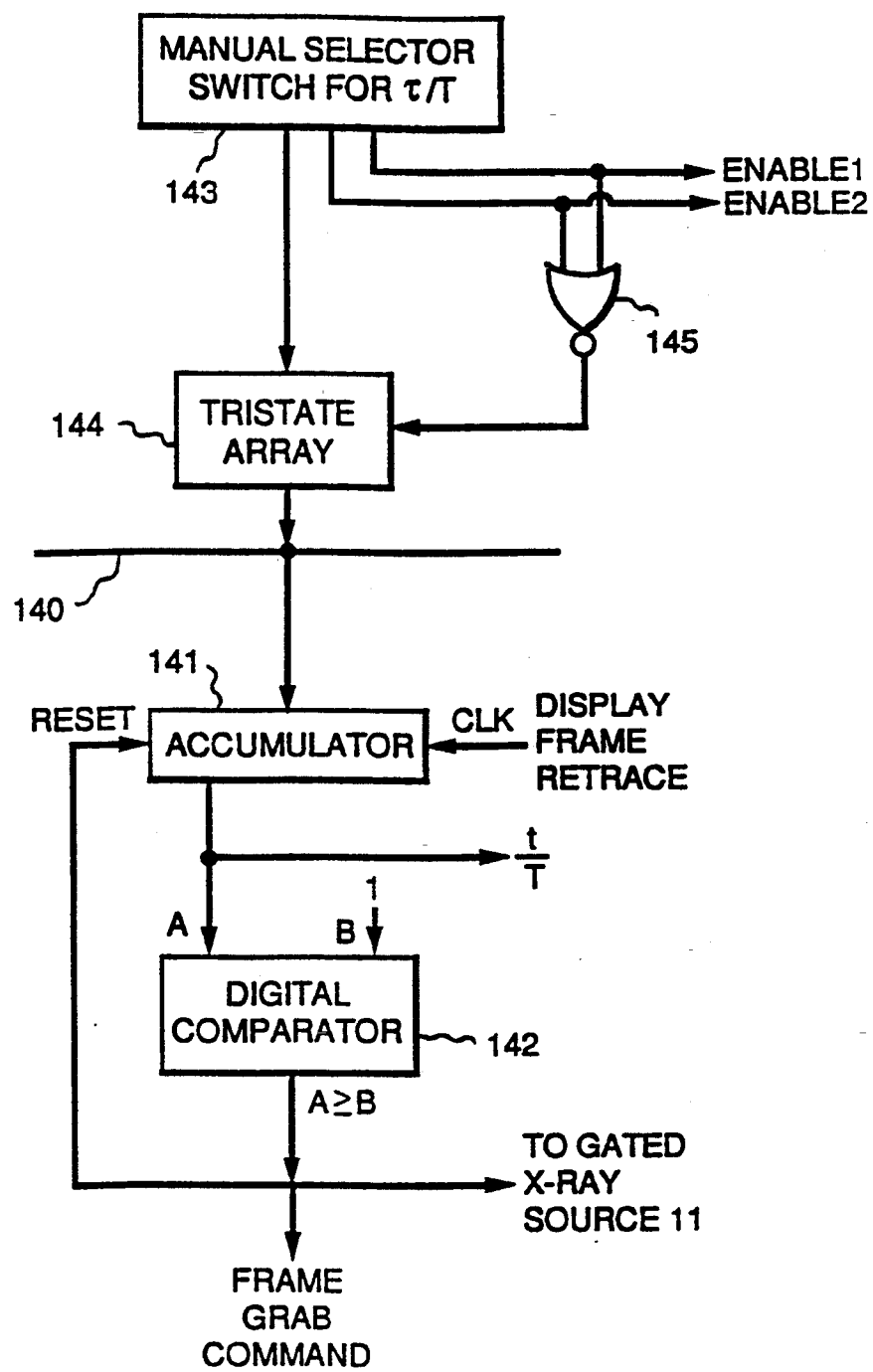
FIG. 12 is a schematic diagram of circuitry as can be included within the master control circuitry of the FIG. 1 fluoroscopic apparatus, to control the rate at which x-ray exposure and frame grabbing are performed.

FIG. 12 shows a portion of the master control circuitry 2. A digital bus 140 has a $\tau/T$ value asserted thereon, which $\tau/T$ value is a rounded-upward binary-number fraction that is the reciprocal of an integer descriptive of the number of frames displayed by the video monitor 23 for each frame grabbed from the video camera 5 because of its recording an x-ray exposure by the gated x-ray source 11. An accumulator 141, reset to arithmetic zero each time a FRAME GRAB COMMAND signal is ONE and clocked by display frame (vertical) retrace pulses, accumulates the $\tau/T$ value asserted on the digital bus 140 to generate an accumulator output signal t/T to be supplied to the pixel displacement computer 5 (or 95). A digital comparator 142 compares the accumulator output signal t/T to unity, putting out a FRAME GRAB COMMAND signal that is ONE only when t/T equals or exceeds unity. This ONE not only resets the accumulator 141, but gates the x-ray source 11 to deliver its pulsed x-ray radiation 10. Furthermore, in the read-/write control circuitry 6 for camera memory in the FIG. 1 fluoroscopic apparatus, this ONE ANDs with the frame grab count from the counter 27 and bank selection signals to write selected banks of the frame store 1; and this ONE ANDs with the complemented frame grab count from the counter 27 and bank selection signals to write selected banks of the frame store 0.

FIG. 12 shows how a value $\tau/T$ selected by a manual selector switch 143, such as a multiple-pole-multiple-position rotary switch, can be selectively asserted on the digital bus 140. T is the time between corresponding pixels in successive grabbed frames, and $\tau$ is the time between corresponding pixels in successive display frames. A plurality of the poles of the selector switch 143 supply respective bits of the manually selected value of $\tau/T$ to be conditionally asserted on the digital bus 140 by an array 144 of tristates, responsive to their receiving a ONE from a NOR gate 145. Additional poles of the selector switch 143 supply respective ZEROs as input signals to the NOR gate 145 when a manually selected value of $\tau/T$ is to asserted on the digital bus 140. When a value of $\tau/T$ automatically determined by a portion of the master control circuitry 2 is to be used, as determined by a setting of the manual selector switch 143, an ENABLE1 signal from an additional pole of the switch 143 is selected to be ONE to serve as an enabling signal for that portion of the master control circuitry 2 automatically determining the value of $\tau/T$. When a value of $\tau/T$ automatically determined by another portion of the master control circuitry 2 is to be used, as determined by a setting of the manual selector switch 143, an ENABLE2 signal from another additional pole of the switch 143 is selected to be ONE to serve as an enabling signal for that other portion of the master control circuitry 2 automatically determining the value of $\tau/T$. Either the ENABLE1 or the ENABLE2 signal being a ONE conditions the NOR gate 145 to supply a ZERO to the array 144 of tristates, conditioning them to be in their high-output-impedance state so their respective output conditions do not affect the automatically determined value of $\tau/T$ asserted on the digital bus 140 by that portion of the master control circuitry 2 enabled to do so. The manual selector switch 143 may have its settings for non-automatic operation labelled in time units. Alternatively, to avoid the operator having to refer to a table of settings for particular types of observation, the manual selector switch 143 may have each of its settings for non-automatic operation labelled in terms of the particular types of observation for which that setting is appropriate.

Figure 13:
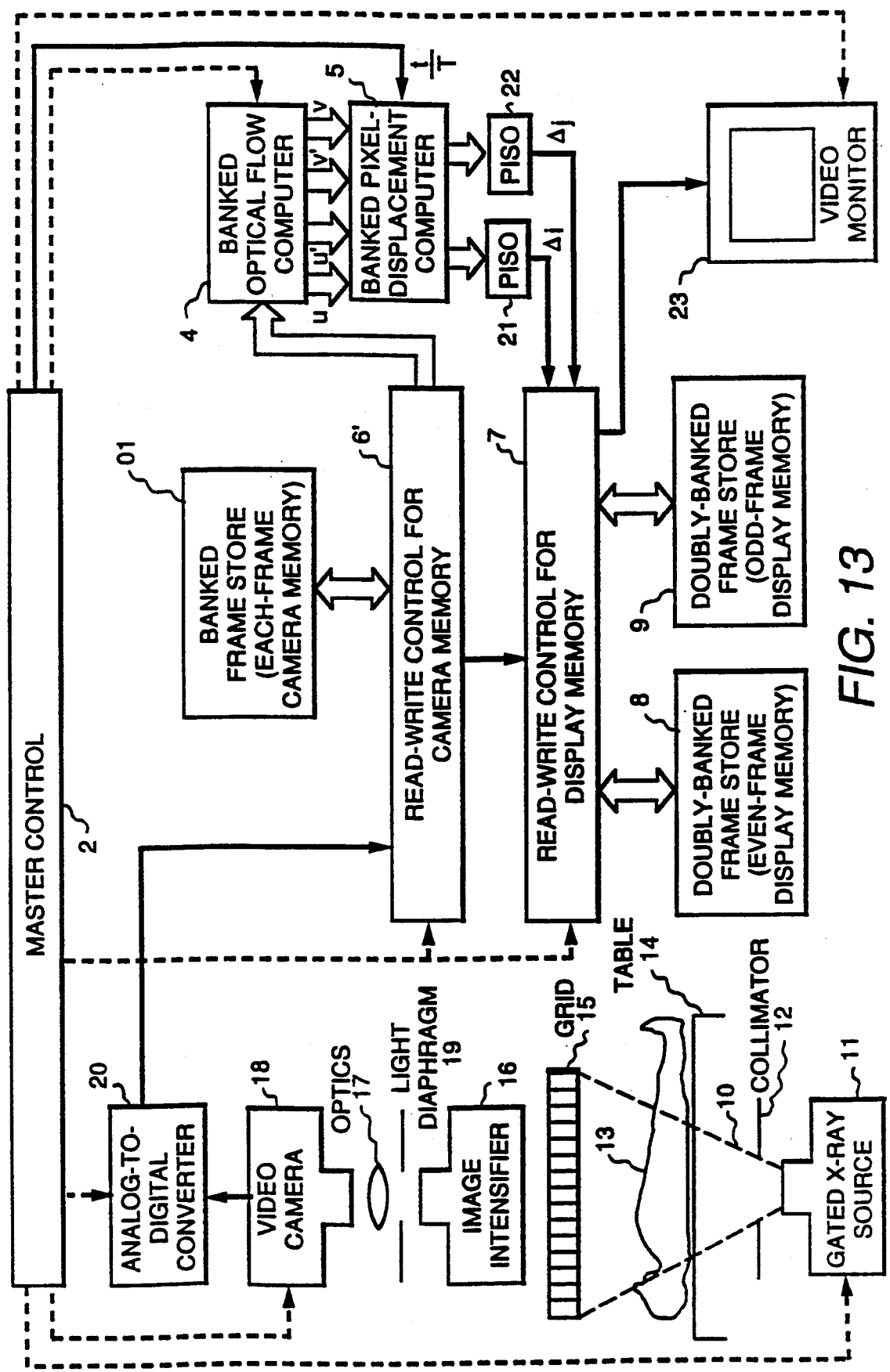
FIG. 13 is a schematic diagram of fluoroscopic apparatus embodying the invention, which uses a reduced-size camera memory as compared to the FIG. 1 fluoroscopic apparatus.

FIG. 13 shows fluoroscopic apparatus that differs from the fluoroscopic apparatus shown in FIG. 1 in that a single frame store 01 provides camera memory. The frame store 01 successively stores both even and odd frames, replacing the respective frame store 0 for storing even frames and the respective frame store 1 for storing odd frames, as are used in the FIG. 1 fluoroscopic apparatus. The frame store 01 is doubly banked. This implements a 16-pixel-wide, two-scan-line-high window of image samples being read in parallel to the optical flow computer 4 for calculating $I_j$ and $I_t$ parallel-in/serial out register, during the display frame interval when a frame of new image samples is being grabbed for writing the frame store 01. During display frame intervals between those in which new image samples are grabbed, image samples from a one-scan-line-high half of this window are forwarded to the parallel-in/serial-out register 66 for conversion to a normal raster scanning of image samples. Operation is generally similar to that of the FIG. 1 fluoroscopic apparatus when it generates fill frames by extrapolating from the most recently grabbed frame, per the FIG. 3 timing diagram.

Figure 14:
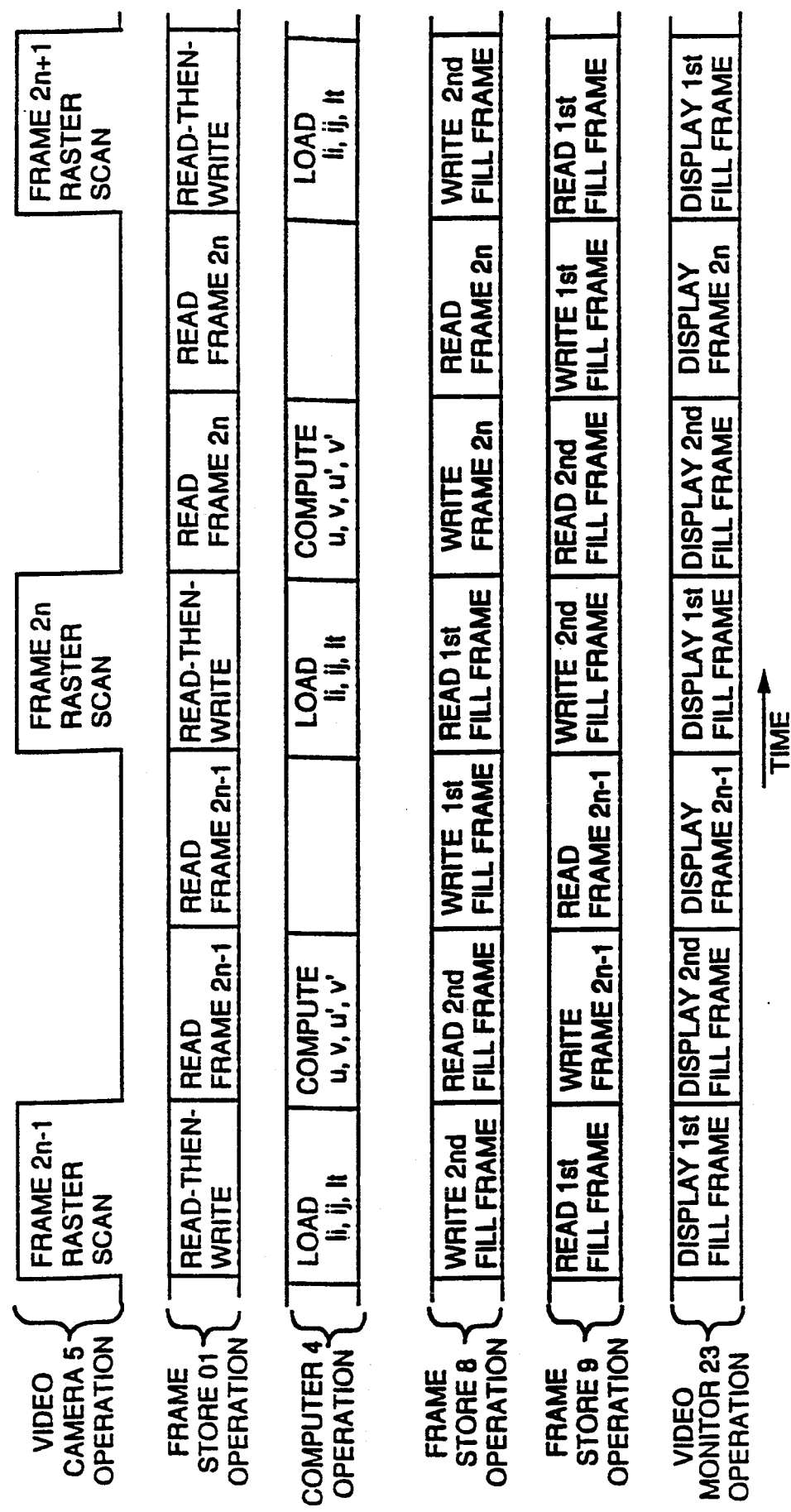
FIG. 14 is a timing diagram of the operation of the FIG. 13 fluoroscopic apparatus in which extrapolation from the most recently grabbed frame of image samples is always used to generate fill frames.

FIG. 14 is a timing diagram illustrative of this similar operation. The frame store 01 is operated on a read-then-write basis when grabbing a new frame of image samples, making available the previously grabbed frame of image samples for subtractive combination with the newly grabbed image samples in the optical flow computer 4 to calculate $I_t$ samples for loading at pixel scan rate into a respective frame store in the computer 4. The samples a scan line back, as read from frame store 01 and thereafter written back into that frame store, are subtractively combined within the computer 4 with the currently written samples to calculate $I_j$ samples for loading at pixel scan rate into a respective frame store in the computer 4. Each of the currently written samples is subjected to unit-pixel delay, to generate differentially delayed samples that are subtractively combined within the computer 4 to calculate $I_i$ samples for loading at pixel scan rate into a respective frame store in the computer 4.

Figure 15:
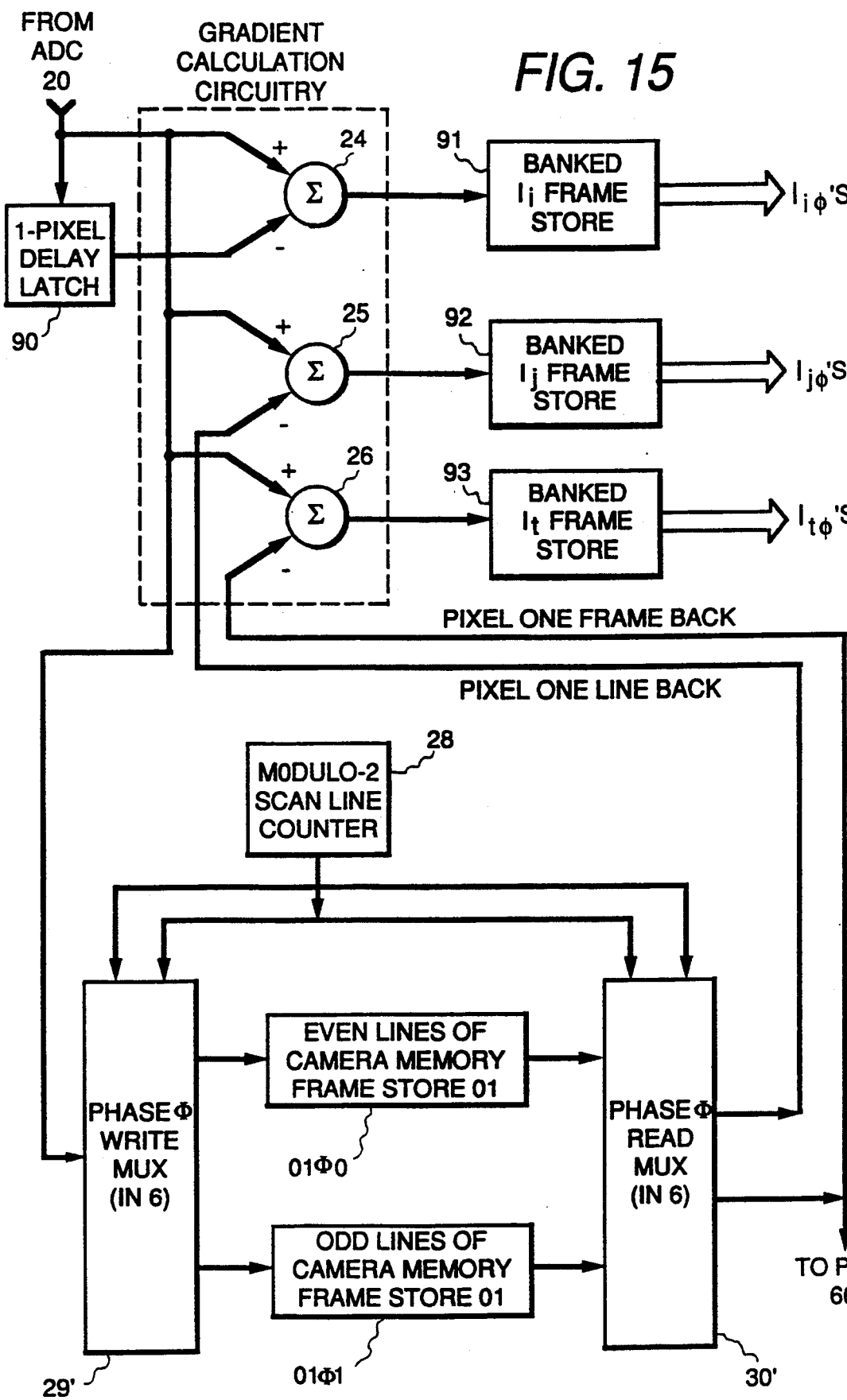
FIG. 15 is a schematic diagram of gradient calculation circuitry in the FIG. 13 fluoroscopic apparatus.

FIG. 15 shows how the portion of the optical flow computer shown in FIG. 4 is modified when the single frame store 01 replaces the frame stores 0 and 1 respectively storing alternate grabbed frames. The grabbed frame counter 27 is dispensed with, the select-one-of-four camera-memory write multiplexer 29 is replaced with a select-one-of-two camera-memory write multiplexer 29', and the select-one-of-four camera-memory read multiplexer 30 is replaced with a select-one-of-two camera-memory read multiplexer 30'. Responsive to the modulo-two scan line count from the modulo-two scan line counter 28, the camera-memory write multiplexer 29' selects bank 01Φ0 of the frame store 01 for writing thereinto pixels in even-numbered scan lines; and the multiplexer 29' selects bank 01Φ1 of the frame store 01 for writing thereinto pixels in odd-numbered scan lines. Responsive to the modulo-two scan line count, the camera-memory read multiplexer 30' selects the bank of the frame store 01 selected for being written into for reading-before-writing to provide image samples one grabbed frame back to the subtractor 26, and the multiplexer 30' selects the bank of the frame store 01 not selected for being written into for reading to provide image samples one scan line back to the subtractor 25.

Figure 16:
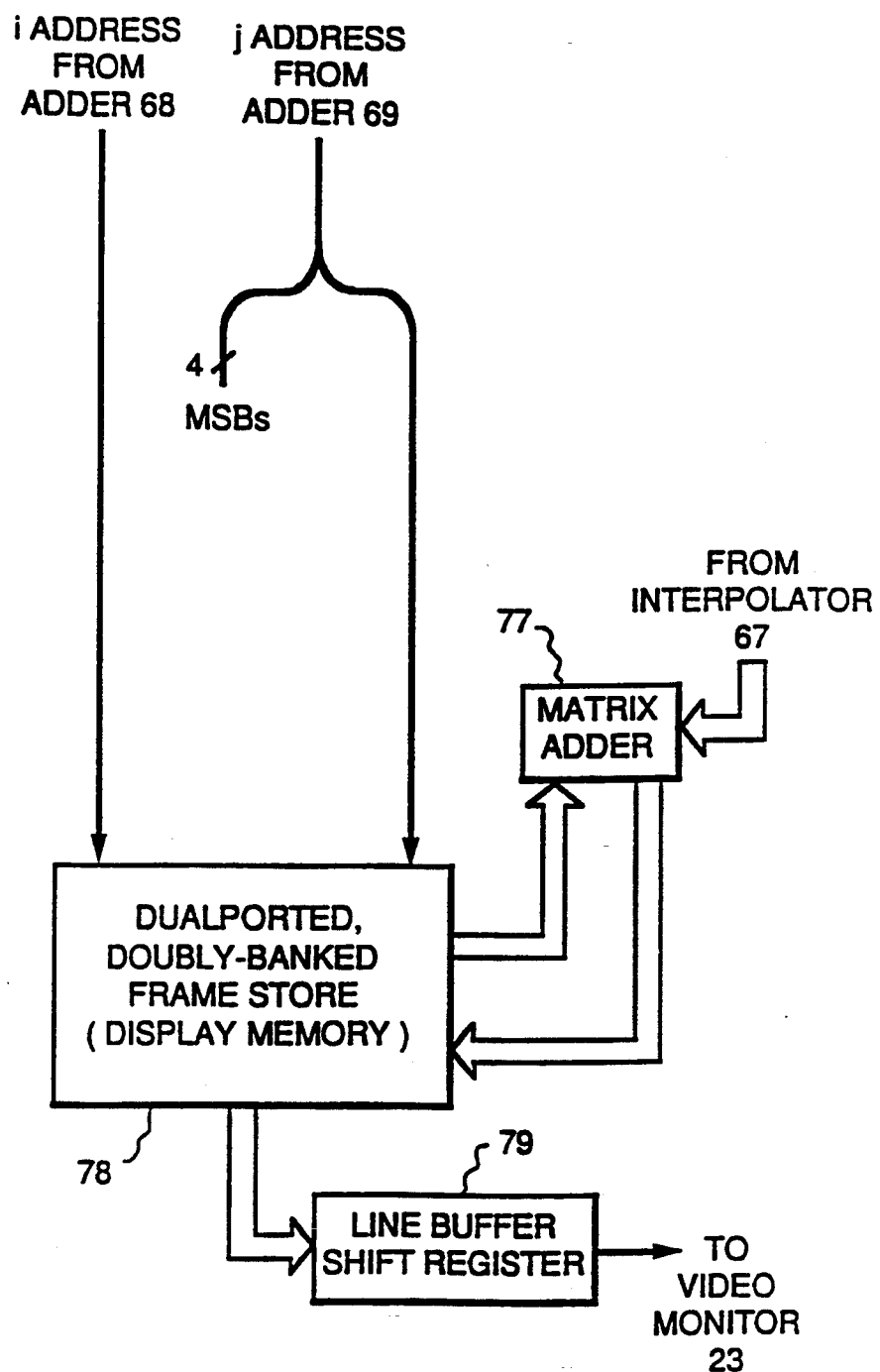
FIG. 16 is a schematic diagram of an alternative way of generating display information from stored camera samples, which provides a saving in display memory requirements and may be used in modified FIG. 1 or FIG. 13 fluoroscopic apparatus.

FIG. 16 shows a modification that can be made to the FIG. 1 or FIG. 13 fluoroscopic apparatus, which modification reduces the amount of display memory required. The frame stores 8 and 9 are dispensed with in favor of a dual-ported random-access memory 78. Here, "dual-ported" means that the RAM 78 has, in addition to the customary read/write port a read-only port through which read-only port a line of memory data loaded in parallel into a parallel-in/serial-out register within the RAM 78 may be serially unloaded at a relatively high reading rate.

The multiplexers 70-76 are also dispensed with. The matrix adder 77 receives only the read output signal of RAM 78 as 2×2 augend input signal and supplies its 2×2 sum output signal to write only the RAM 78. To aid the understandability of FIG. 16, these reading and writing procedures are shown therein as being performed through separate ports; but, in actuality, these reading and writing procedures are performed as a succession of read-then-write operations through the same port, the read/write port of the dual-ported RAM 78. The read-only serial ports of the banks of RAM 78 are connected through a pixel-interleaving multiplexer (not specifically shown) to a read-only serial port for the whole of RAM 78. During each line retrace interval in the active portions of the frame, a completely written scan line of video samples is read out through the read-only serial port for the whole of the dual-ported RAM 78 at a multiple (e.g., eight) times normal pixel scan rate, to load serially a line-buffer shift register 79. In the ensuing line trace interval, the line-buffer shift register 79 is serially unloaded at normal pixel scan rate, to supply video samples to the video monitor 23.

Accordingly, RAM 78 only needs to store part of a frame of successive video signal samples. RAM 78 is written into during both even and odd display frames. Assuming RAM 78 only stores part of a frame, RAM 78 is randomly addressed in the direction by the sum output signal of the adder 68 and in the j direction by all but the most significant few bits of the sum output signal of the adder 69. For example, since the number of full pixels of displacement in the Δj component of the displacement vector is not expected to exceed five or so, RAM 78 needs only to store sixteen lines of video samples, and may be addressed on a wrap-around basis using all except the four most significant bits of the sum output signal of the adder 69 (assuming the vertical scan generator 65 output signal to be unsigned). The selection of the scan line to be read during horizontal retrace, in order to load the line buffer shift register 79, should be carried out such that reading-then-writing of the scan line to accumulate fill frame data has been previously completed.

Variants of the FIG. 16 display memory are possible using a single-ported doubly-banked RAM that is of such size as to store only a partial frame—e.g., sixteen scan lines—and avoid the need for the line buffer shift register 79. An i address multiplexer and a j address multiplexer is used for the single-ported doubly-banked RAM. The accumulation of fill frame data from the interpolator 67 is done by reading-then-writing the RAM during first halves of the pixel intervals, with the i address multiplexer selecting the adder 68 sum output signal as the i address for the RAM and the j address multiplexer selecting all but the four most significant bits of the adder 69 sum output signal as the j address for the RAM. The reading of fill frame data to the video monitor 23 is done by reading the RAM during second halves of the pixel intervals, with the i address multiplexer selecting the horizontal digital scan generator 64 output signal as the i address for the RAM and the j address multiplexer selecting all but the four most significant bits of the vertical digital scan generator 65 sum output signal as the j address for the RAM. The selection of the scan line to be read to the video monitor 23 is such that reading-then-writing of the scan line to accumulate fill frame data has been previously completed. The first and second halves of each pixel interval may be its initial and final halves, respectively; or, alternatively, the first and second halves of each pixel interval may be its final and initial halves respectively.

Figure 17:
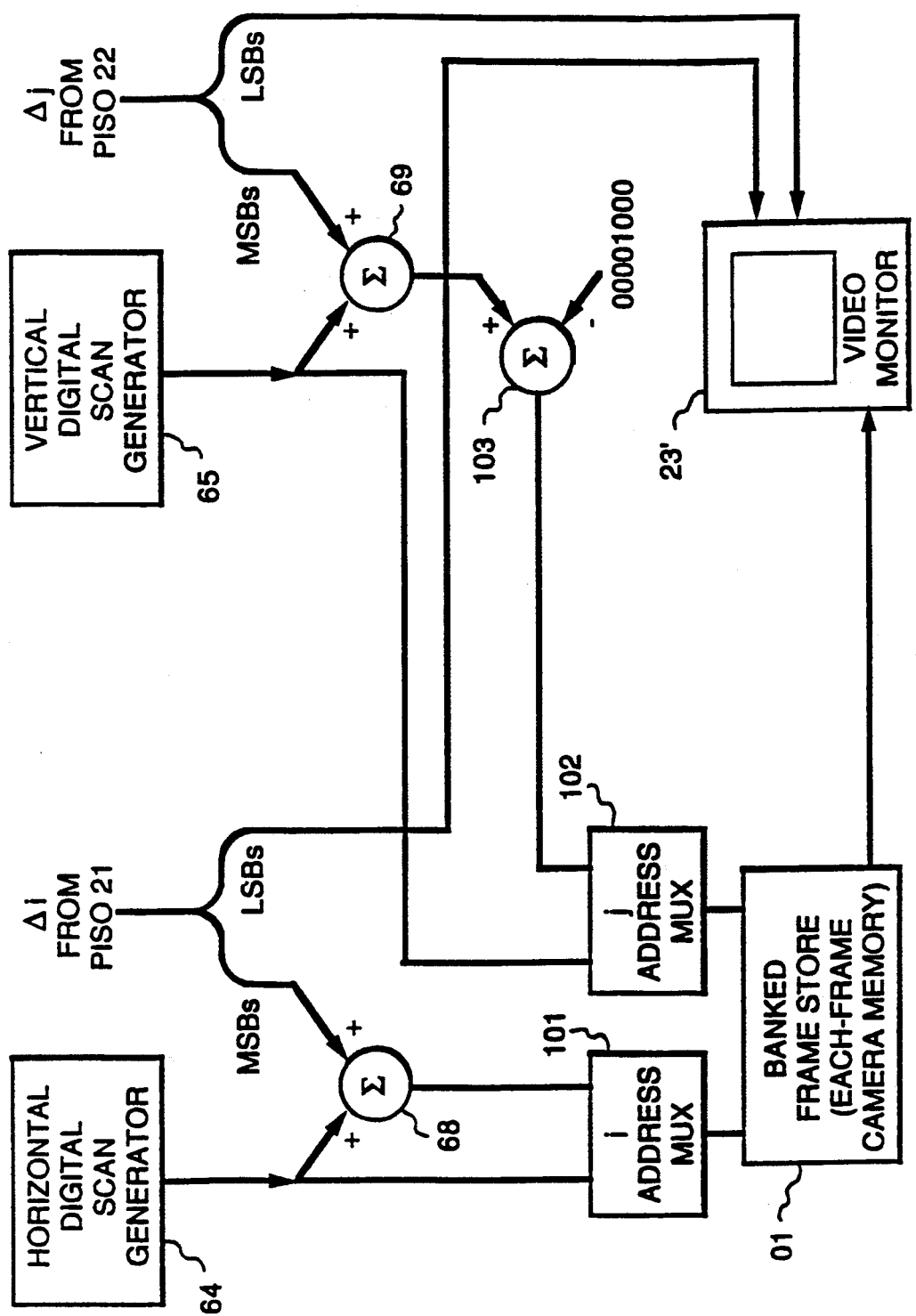
FIG. 17 is a schematic diagram of an alternative way of generating display information from stored camera samples, which is used in modified FIG. 13 fluoroscopic apparatus to dispense with display memory separate from camera memory.

FIG. 17 shows a modification that can be made to the FIG. 13 fluoroscopic apparatus to avoid the need for the interpolator 67 and for display memory separate from camera memory. The video monitor 23' is of a type as described by W. J. Davis in U.S. Pat. No. 4,415,889 issued Nov. 15, 1983 and entitled "RASTER-SCANNED CRT DISPLAY SYSTEM WITH IMPROVED POSITIONAL RESOLUTION FOR DIGITALLY ENCODED GRAPHICS" or as described by A. Sasaki et alii in U.S. Pat. No. 4,481,509 issued Nov. 6, 1984 and entitled, "RASTER-SCANNED DISPLAY SYSTEM FOR DIGITALLY-ENCODED GRAPHICS". The frame store RAM 01 is supplied its horizontal address by an i address multiplexer 101 and its vertical address by a j address multiplexer 102. During first halves of the pixel intervals, the i address multiplexer 101 selects the output signal of the horizontal digital scan generator 64 to the RAM 01 as its horizontal address, and the j address multiplexer 102 selects the output signal of the vertical digital scan generator 65 to the RAM 01 as its vertical address. During second halves of the pixel intervals, the i address multiplexer 101 selects the sum output signal of the adder 68 to the RAM 01 as its horizontal address, and the j address multiplexer 102 selects the difference output signal of a subtractor 103 to the RAM 01 as its vertical address. The difference output signal of the subtractor 103 is eight less than sum output signal of the adder 65, so it is assured that the RAM 01 is written with the appropriate image samples sought during its reading. The vertical digital scan generator 65 is designed to count at least eight more scan lines than in the active portion of a full display frame, so that all image data written into the RAM 01 is subsequently read to the video monitor 23'; and, though not indicated in FIG. 17, appropriate interframe blanking is provided to RAM 01 read-out.

Instead of using the interpolator 67 to compensate for fractional-pixel offsets between scan coordinates in fill frames and in camera-data frames, the fractional portions of the $\Delta i$ and $\Delta j$ pixel displacements are supplied to the video monitor 23' to induce perturbations from normal raster scan that more accurately locate the displaced pixel on the kinescope screen. These perturbations from normal raster scan may be induced within the kinescope by horizontal and vertical minor deflection coils supplied currents in accordance with the $\Delta i$ and $\Delta j$ displacement terms, for example.

Modification can be made to the FIG. 1 fluoroscopic apparatus that is of the same general nature as that modification of the FIG. 13 fluoroscopic apparatus shown in FIG. 17. Providing for minor deflection of the video monitor kinescope makes difficult further processing of fill frames to suppress certain undesirable artifacts—such as those generated by ecliptic effects—which may be accomodated by interpolating forward into display memory, as previously described.

At the cost of appreciable spatial frequency aliasing of the image displayed on the video monitor 23, a designer can elect to ignore fractional portions of the $\Delta i$ and $\Delta j$ pixel displacements altogether in generating the digitized video signal supplied to the video monitor 23. This, rather than providing for more precise remapping of the camera-originated image samples either by interpolating forward into display memory or by providing for minor deflection of the video monitor kinescope.

Thusfar in this specification, t/T has tacitly been assumed to be constant-valued, as would be the case if the video camera 5 frames were grabbed at a uniform rate corresponding to an x-ray exposure rate that was a fixed fraction of the rate at which frames are displayed by the video monitor 23, so the one-exposure-per-camera frame dose the patient 13 receives from the gated x-ray source 11 is accordingly reduced. As long as there is no appreciable motion of the x-ray image from one grabbed frame to the next, this reduced frame grab rate is acceptable, since the frame filling procedures described above satisfactorily provide the successive frames of video samples needed by the video monitor 23. When the x-ray image exhibits more motion, video samples sufficiently current that reliable motion estimates can be made are no longer available. Also, the background pixels coming out of the eclipse of foreground objects that are particularly subject to error tend to become too large in number to escape the notice of a person viewing the video monitor 23. To keep these problems from becoming severe, it is desirable to be able to grab camera frames containing x-ray image samples at increased rate and thus decrease T, which is inversely related to the rate of grabbing camera frames containing x-ray image samples.

Figure 18:
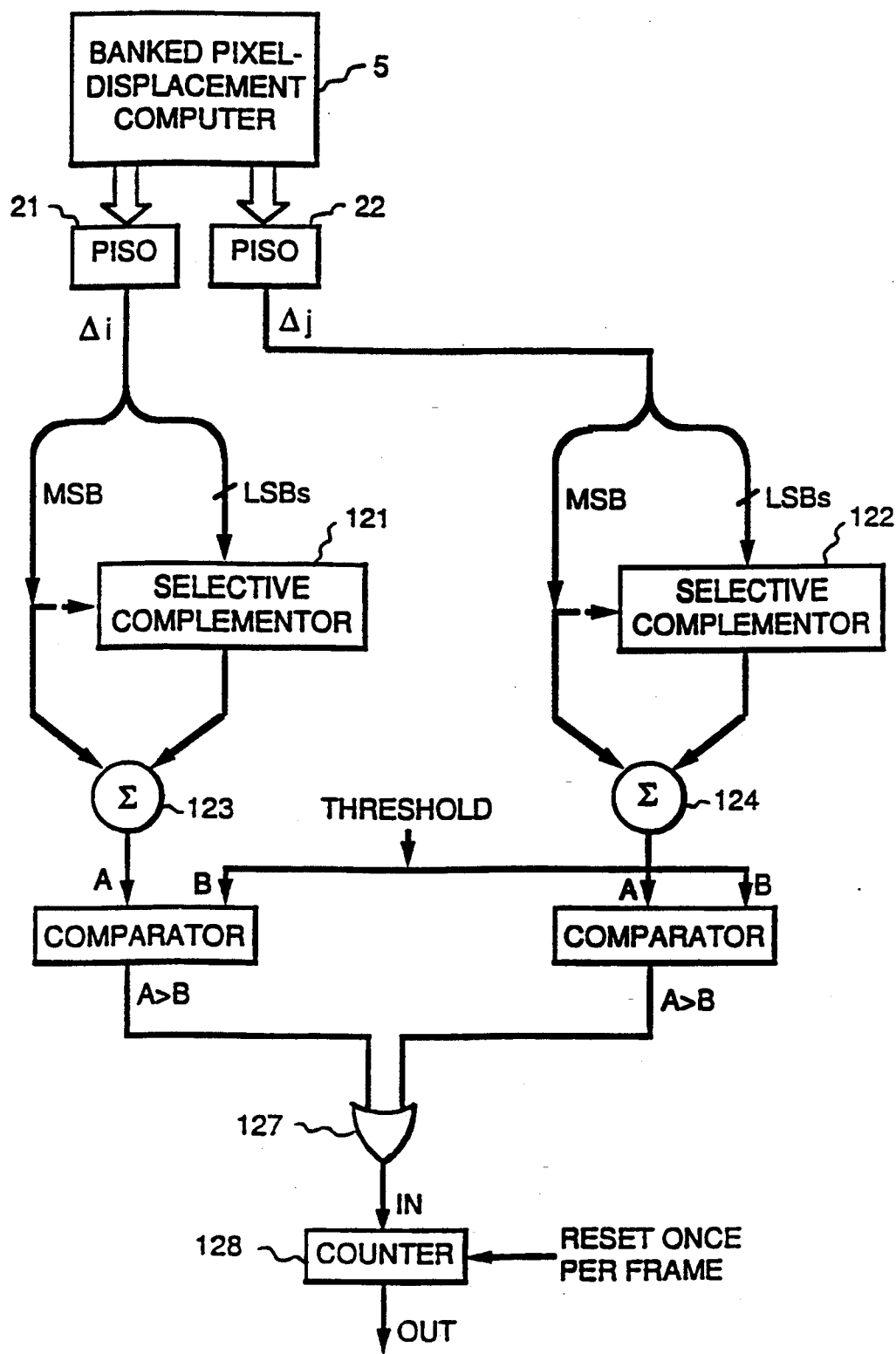
FIG. 18 is a schematic diagram of apparatus that can be used for evaluating the amount of frame-to-frame change in successive fluoroscopic images generated in the FIG. 1 fluoroscopic apparatus.

FIG. 18 shows circuitry for determining that there is excessive motion between camera-originated frames, as indicates that there should be an increase in the rate that video camera 5 frames containing x-ray image samples are grabbed. When there is a large amount of motion in images, there will be an increase in the number of pixels having a large amplitude pixel displacement vector associated therewith. By counting the number of pixels that occur in a frame which pixels have a "large" amplitude pixel displacement vector, a measure of the interframe motion can be obtained. An adequate approximation of this measure of interframe motion can be obtained, without having to take the vector sums of the respective $\Delta i$ and $\Delta j$ displacement components for each pixel, by counting the number of times in a frame that at least one of the $\Delta i$ and $\Delta j$ components of pixel displacement has an amplitude that exceeds a threshold value. This is the procedure the FIG. 18 circuitry implements.

The absolute value of $\Delta i$ is obtained by stripping its most significant sign bit and using the stripped sign bit to cause a selective complementor 121 to complement the less significant bits of $\Delta i$ when the stripped sign bit is a ONE. A digital adder 123 adds the selectively complemented less significant bits of $\Delta i$ to the stripped sign bit to generate, as the sum output signal from adder 123, the absolute value of $\Delta i$. The absolute value of $\Delta i$ is compared to a threshold value in a digital comparator 125. Only when the absolute value of $\Delta i$ exceeds the threshold value, does the comparator 125 supply a ONE output signal to a two-input OR gate 127.

The absolute value of $\Delta j$ is obtained by stripping its most significant sign bit and using the stripped sign bit to cause a selective complementor 122 to complement the less significant bits of $\Delta j$ when the stripped sign bit is a ONE. A digital adder 124 adds the selectively complemented less significant bits of $\Delta j$ to the stripped sign bit to generate, as the sum output signal from adder 124, the absolute value of $\Delta j$. The absolute value of $\Delta j$ is compared to a threshold value in a digital comparator 126. Only when the absolute value of $\Delta j$ exceeds the threshold value, does the comparator 126 supply a ONE output signal to the OR gate 127.

Responsive to either of its input signals being a ONE indicative of the absolute value of $\Delta i$ or the absolute value of $\Delta j$ exceeding threshold value, the OR gate 127 outputs a ONE to the count input port of a digital counter 128. The digital counter 128 is reset to zero count after the initial scanning of a grabbed frame, before resetting providing a count indicative of the motion content in the most recently grabbed frame.

Figure 19:
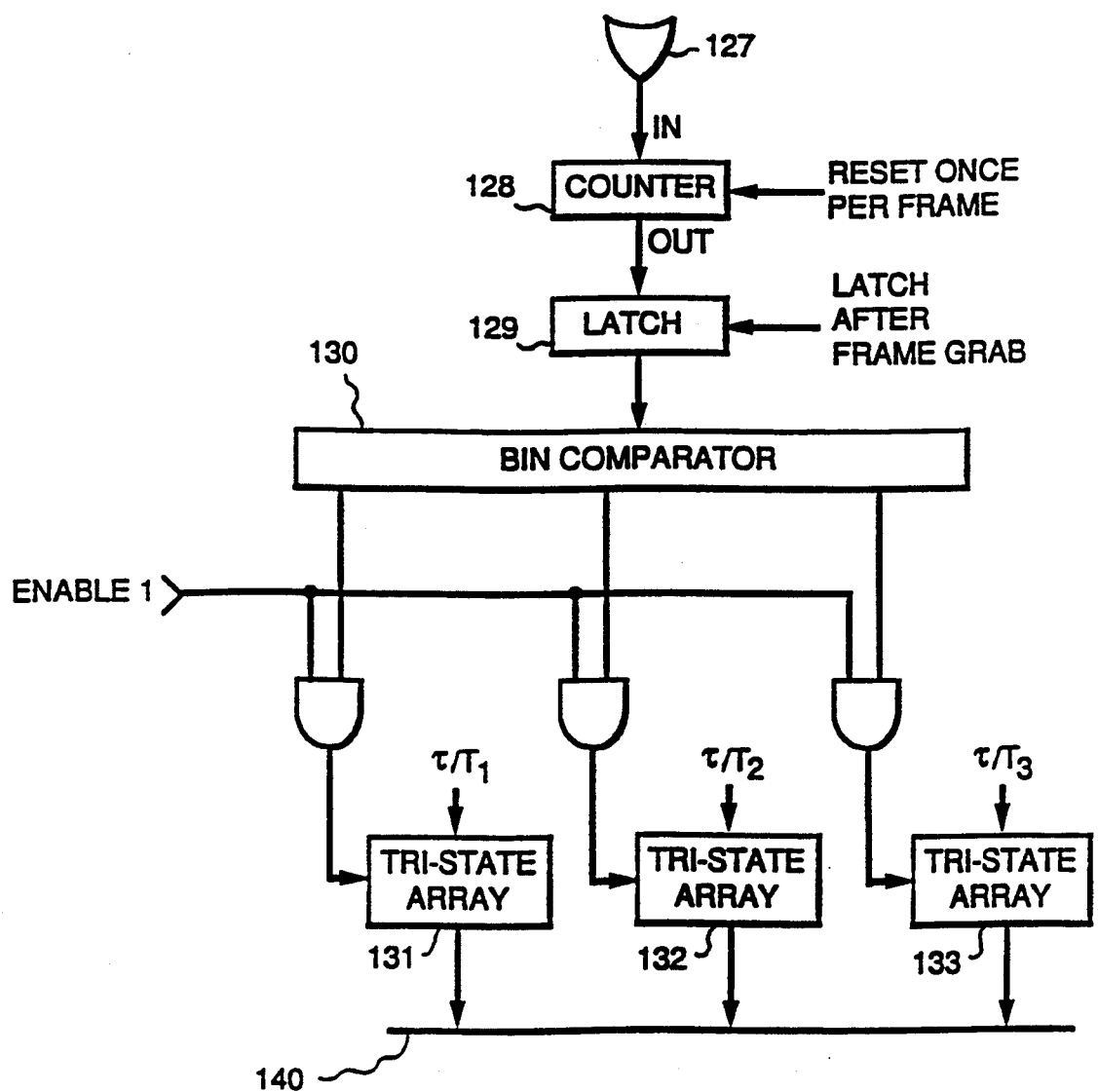
FIG. 19 is a schematic diagram of image timing apparatus as can be used in the FIG. 1 fluoroscopic apparatus for responding to indications of excessive amounts of frame-to-frame change in successive fluoroscopic images to increase the rate at which fluoroscopic images are obtained, to implement a further aspect of the invention.

FIG. 19 shows circuitry for responding to this count to adjust the gating rate of the x-ray source 11 and of frame grabbing of video camera 5 video output signal. A latch 129 latches the count indicative of the motion content in the most recently grabbed frame, to provide the input signal of a bin comparator 130. The bin comparator 130 determines which of a plurality of successively higher ranges the latched count falls, putting a ONE out from a corresponding bin output port and putting a ZERO out from the other bin output ports. A ONE for a first bin output port of the bin comparator 130 as ANDed with an ENABLE1 signal that is ONE causes an array 131 of tristates to assert a value $\tau/T_1$ on a digital bus 140; a ONE from a second bin output port of the bin comparator 130 as ANDed with an ENABLE1 signal that is ONE causes an array 132 of tristates to assert a value of $\tau/T_2$ on the digital bus 140; a ONE from a third bin output port of the bin comparator 130 as ANDed with an ENABLE1 signal that is ONE causes an array 133 of tristates to assert a $\tau_3/T_3$ on the digital bus 140; and this procedure may be extended to as many bin output ports as a designer wishes.

When fluoroscopically viewing certain organs—for example, the heart—there may be times that there is considerable motion from display frame to display frame, but it is not of much value for diagnostic purposes. Automatically controlling the x-ray-exposure and frame-grabbing rate as just described in connection with FIGS. 17 and 18 may call for more x-ray exposures than needed. This is particularly so since some tendency to too frequently expose must be built into the automatic control if it is to be able to adjust quickly enough to rapid increases in the motion rate of the organ being observed, rapidity being measured respective to display frame rate. At the same time, a manual setting of x-ray-exposure and frame-grabbing rate that provides lower radiation dosage will result in an insufficient number of x-ray exposures (and associated frame grabs) during the intervals of diagnostic value. A solution to this problem is available when the motion in the medical image can be predicted. In the case of the heart, motion is cyclic in nature, and the intervals of greatest diagnostic value are just before and just after the heart is electrically stimulated to make its major contraction.

Figure 20:
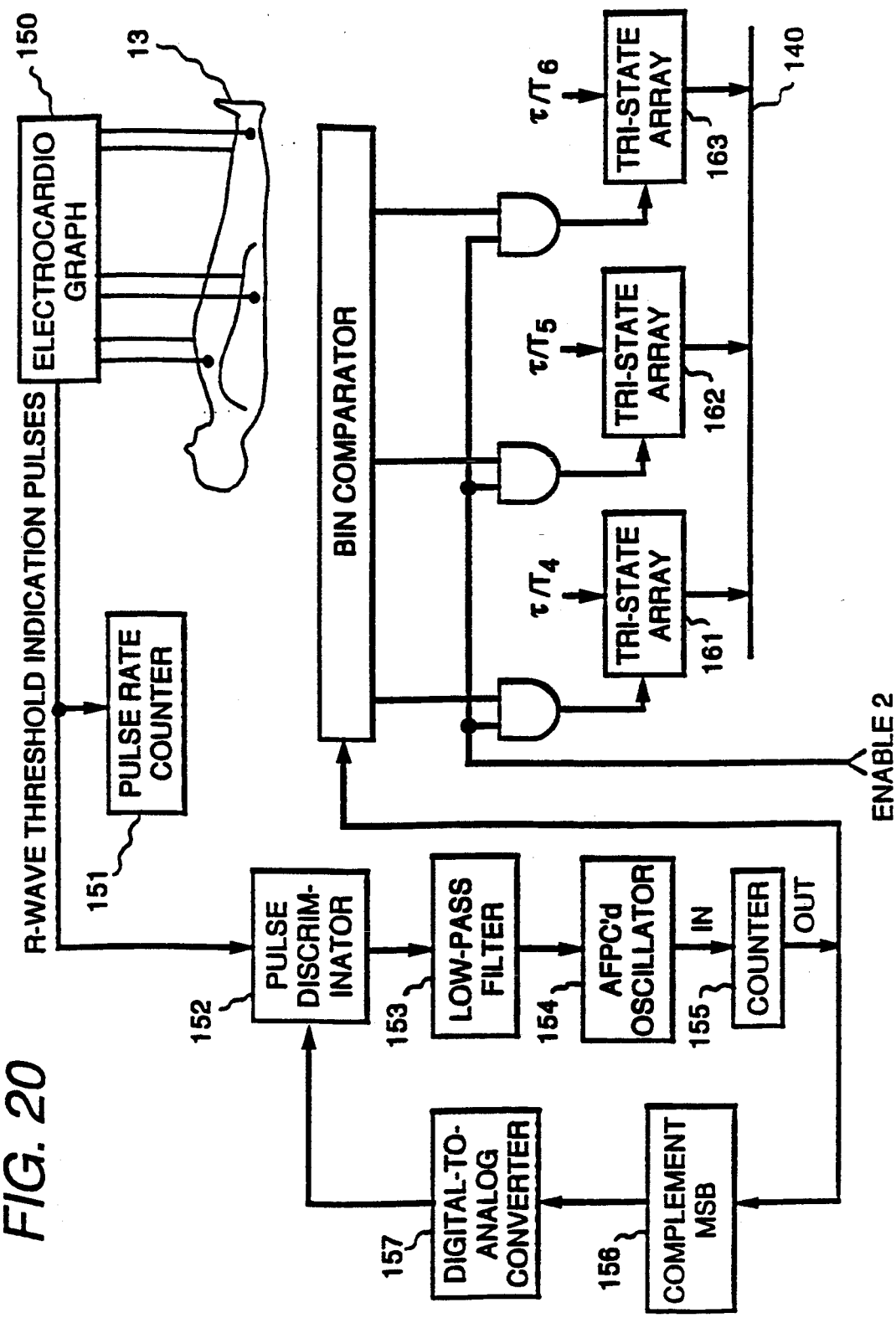
FIG. 20 is a schematic diagram of other image timing apparatus as can be used in the FIG. 1 fluoroscopic apparatus for controlling the rate at which fluoroscopic images are obtained, in accordance with a still further aspect of the invention.

As shown in FIG. 20, an electrocardiograph 150 is conventionally used to monitor the heart of the patient 13, supplying a pulse to a pulse rate counter 151 each time the heart is electrically stimulated to make its major contraction. These pulses are called "R-wave threshold indications". Where the same patient 13 is being fluoroscoped by the FIG. 1 fluoroscopic apparatus as further shown in FIG. 20, the R-wave threshold indications from the electrocardiograph 150 may be used to control the rate of x-ray exposure from the gated x-ray source 11 and of the frame grabbing from the video camera 5. The R-wave threshold indication pulses are supplied to a pulse discriminator 152 that is also supplied a sawtooth waveform of a frequency and a phase which are to be locked by feedback to correspond to those of the pulse rate indications from the electrocardiograph 150. Error signals generated by departures from the desired lock are integrated in a low-pass filter 152 and applied as automatic frequency and phase control (AFPC) signal to an oscillator 154. The oscillator 154 is to be locked so it provides oscillations at a high multiple of the pulse rate from electrocardiograph 150. The oscillator 154 supplies output pulses at a rate related to its oscillation frequency (e.g., one half) for counting in a digital counter 155 to generate a sampled-data digital description of a sawtooth wave. The counter 155 is a multi-stage binary counter reset on reaching full count less one. Circuitry 156 complements the most significant bit of the count from the counter 155, thereby to suppress the direct component of the sawtooth as converted to analog voltage form by a digital-to-analog converter 157. The analog sawtooth voltage from the digital-to-analog converter 157 is applied to the pulse discriminator 152 to complete the automatic frequency and phase control loop controlling the oscillations of the oscillator 154.

The count from the counter 155 charts the timing of the cyclic operation of the heart of the patient 13. This timing information is supplied to a bin comparator 160 to determine in what portion of the cycle of heart operation the heart of the patient 13 is. A ONE for a first bin output port of the bin comparator 160 as ANDed with an ENABLE1 signal that is ONE causes an array 161 of tristates to assert a value, $\tau/T_4$ on a digital bus 140; a ONE from a second bin output port of the bin comparator 160 as ANDed with an ENABLE1 signal that is ONE causes an array 162 of tristates to assert a value of $\tau/T_5$ on the digital bus 140; a ONE from a third bin output port of the bin comparator 160 as ANDed with an ENABLE1 signal that is ONE causes an array 163 of tristates to assert a $\tau/T_6$ on the digital bus 140; and this procedure may be extended to as many bin output ports as a designer wishes.

The use of the electrocardiograph to indicate when x-ray exposures should be made also eliminates need for one or more learning periods in which to determine automatically an appropriate sequence of x-ray exposures. $T_4$, $T_5$ and $T_6$, the lengths of time between grabbing frames as may be set by the FIG. 20 apparatus may correspond wholly, in part or not at all with $T_1$, $T_2$ and $T_3$, the lengths of time between grabbing frames as may be set by the FIG. 19 apparatus.

The optical flow computations may be made in other ways, as known from the prior art. While the optical flow computer described allots the same amount of time to each pixel for calculating its displacement, it is known that successive frames of image data can be subtractively combined in a frame comb filtering procedure and the difference threshold detected to distinguish those portions of a current frame of image data where motion has occurred and those portions of a current frame of image data where motion has not occurred. This information can be used to cause the calculations of displacement to be skipped in portions of the image exhibiting little or no motion, to cause instead the displacement to be automatically reported as being zero, and to cause scanning of the image field to proceed at changing rates, relying on a system of scan interrupt in portions of the image field where frame-to-frame change is detected. In their paper "Motion-Compensated Television Coding: Part I" appearing in pages 631–670 of The Bell System Technical Journal, Vol. 58, No. 3 for March 1979 A. N. Netravali and J. D. Robbins describe methods to calculate motion estimates for the various portions of image fields other than using simple frame-difference prediction, which methods rely on iterative matching intensity gradients between frames. The optical flow computer 4 can be replaced by an optical flow computer using the Netravali and Robbins methods, which methods as described in the referenced article operate substantially in real time rely on image data that have already occurred during image raster scanning prior to each pixel for which a motion estimate is being made. The optical flow computer 4 can be replaced by an optical flow computer using variations of the Netravali and Robbins methods where the motion estimates for each pixel are made in somewhat delayed real time and rely on image data that occur shortly after that pixel in image raser scanning as well as before that pixel in image raser scanning. The scope of the claims which follow should be construed to include the design variants obvious, at the time of the making of the invention described in each claim, to one skilled in the art of video image processing and acquainted with both the foregoing specification and the pertinent prior art.

What is claimed is:

1. Frame-filling apparatus for generating digital samples respectively descriptive of raster-scanned picture elements in a succession of output frames regularly occurring at a prescribed output frame rate, proceeding from digital samples respectively descriptive of raster-scanned picture elements in input frames that occur less frequently than said output frames, comprising:

a camera memory including at least one frame store, into which camera memory digital samples respectively descriptive of raster-scanned picture elements in input frames are written for temporary storage pursuant to a frame grabbing procedure, said at least one frame store storing a most recently grabbed one of said input frames of digital samples;

an optical flow computer;

means included in said optical flow computer for calculating and supplying, as a first output signal u from said optical flow computer, the apparent displacement, in a first direction parallel to the raster line scan, of each picture element in said most recently grabbed one of said input frames respective to a corresponding picture element in a previously grabbed one of said input frames;

means included in said optical flow computer for calculating and supplying, as a second output signal v from said optical flow computer, the apparent displacement, in a second direction transversal to the raster line scan, of each picture element in said most recently grabbed one of said input frames respective to a corresponding picture element in a previously grabbed one of said input frames;

means responding to the output signals from said optical flow computer to calculate displacements with time, $\Delta i$ and $\Delta j$, in said first and second directions respectively, of each picture element from said most recently grabbed one of said input frames to its position in a current output frame; and means responding to each digital sample descriptive of a respective picture element from said most recently grabbed one of said input frames and to its calculated respective displacements with time in said first and second directions to generate a digital sample descriptive of a corresponding picture element of said current output frame.

2. Frame-filling apparatus as set forth in claim 1 wherein said optical flow computer includes:

means for calculating and supplying, as a third output signal u' from said optical flow computer, the derivative respective to time of said apparent displacement in said first direction of each picture element in said most recently grabbed one of said input frames respective to a corresponding picture element in a previously grabbed one of said input frames; and means for calculating and supplying, as a fourth output signal v' from said optical flow computer, the derivative respective to time of said apparent displacement in said second direction of each picture element in said most recently grabbed one of said input frames respective to a corresponding picture element in a previously grabbed one of said input frames.

3. Frame-filling apparatus as set forth in claim 1 included in fluoroscopic apparatus for observing at least a portion of a living creature, which fluoroscopic apparatus further includes:

a gated source of x-radiation;

an image intensifier having a first plane surface towards which x-radiation from said gated source thereof is directed and having a second plane surface on which a pattern of light is generated during the operation of said image intensifier responsive to x-radiation impinging on the first plane surface of said image intensifier;

optics for projecting an image of said pattern of light generated by said image intensifier onto a focal plane;

a video camera for sensing said focal plane image to generate a video signal descriptive of a raster scanning of said image; and means responding to said video signal descriptive of said image for generating digital samples descriptive of respective picture elements of said image supplied as input signal to said frame-filling apparatus.

4. Frame-filling apparatus as set forth in claim 1 included in fluoroscopic apparatus for observing at least a portion of a living creature, which fluoroscopic apparatus further includes:

a gated source of x-radiation;

a scintillator having a first plane surface towards which x-radiation from said gated source thereof is directed and having a second plane surface on which a pattern of light is generated during the operation of said scintillator responsive to x-radiation impinging on the first plane surface of said scintillator;

optics for projecting an image of said pattern of light generated by said scintillator onto a focal plane;

a video camera for sensing said focal plane image to generate a video signal descriptive of a raster scanning of said image;

means responding to said video signal descriptive of said image for generating digital samples descriptive of respective picture elements of said image supplied as input signal to said frame-filling apparatus; and a video monitor for generating a display responsive to said output frames of digital samples.

5. Frame-filling apparatus as set forth in claim 1 in combination with:

a video monitor for generating a display responsive to said output frames of digital samples.

* * * * *